US006282547B1

(12) United States Patent
Hirsch

(10) Patent No.: US 6,282,547 B1
(45) Date of Patent: Aug. 28, 2001

(54) HYPERLINKED RELATIONAL DATABASE VISUALIZATION SYSTEM

(75) Inventor: Peter Douglas Hirsch, Danville, CA (US)

(73) Assignee: Informix Software, Inc., Menlo Park, CA (US)

( * ) Notice: Subject to any disclaimer, the term of this patent is extended or adjusted under 35 U.S.C. 154(b) by 0 days.

(21) Appl. No.: 09/139,793

(22) Filed: Aug. 25, 1998

(51) Int. Cl.[7] .................................................... G06F 17/30
(52) U.S. Cl. ...................... 707/102; 345/346; 345/356; 345/357; 717/1; 707/501
(58) Field of Search ..................... 707/102–103, 707/1–6, 501, 513, 104; 345/356, 357, 340–341, 346; 705/8–10, 36–37; 717/1, 11

(56) References Cited

U.S. PATENT DOCUMENTS

| | | | |
|---|---|---|---|
| 5,603,025 | 2/1997 | Tabb et al. ................................ | 707/2 |
| 5,796,932 | * 8/1998 | Fox et al. ..................................... | 1/1 |
| 5,850,548 | * 12/1998 | Williams ............................... | 395/701 |
| 5,893,125 | * 4/1999 | Shostak ................................ | 707/511 |
| 6,014,138 | * 1/2000 | Cain et al. ............................. | 345/335 |

OTHER PUBLICATIONS

"Zoomin and Tunneling in Tioga: Supporting Navigation in Multidemensional Space," Woodruff et al., Proceedings of the 1994 IEEE Symposium n Visual Languages, Oct. 4–7, 1994, pp. 191–193.*

"Tioga–2: A Direct Manipulation Database Visualization Environment," Aiken et al., Proceedins of the 1996 Twelfth International Conference on Data Engineering. Feb. 26–Mar. 1, 1996, pp. 208–217, IEEE.*

Peter Wright, "Working with Visual Modeler," Beginning Visual Basic 6 Objects, Wrox Press Ltd., 398–433.

* cited by examiner

*Primary Examiner*—Hosain T. Alam
(74) *Attorney, Agent, or Firm*—Fish & Richardson P.C.

(57) ABSTRACT

A computer operated apparatus for generating a visual information system is disclosed. A virtual world associated with an application is built using building blocks such as scenes, data sources, global parameters, and resources. A scene is a visual display of information much like a presentation slide, except that the information may be linked to data stored in a database or other data storage systems. Within a scene, values resulting from a data source are represented graphically as user-defined data elements. Data sources are built with a block diagraming tool which generates one or more database queries. The queries may be SQL queries. Scenes are created with a drawing editor which transparently binds data sources to the graphical elements of the scenes. When the virtual world is completed, an execution image of the virtual world may be represented as byte code. The byte code representing the virtual world may be executed by a runtime control to provide desired information to users.

24 Claims, 16 Drawing Sheets

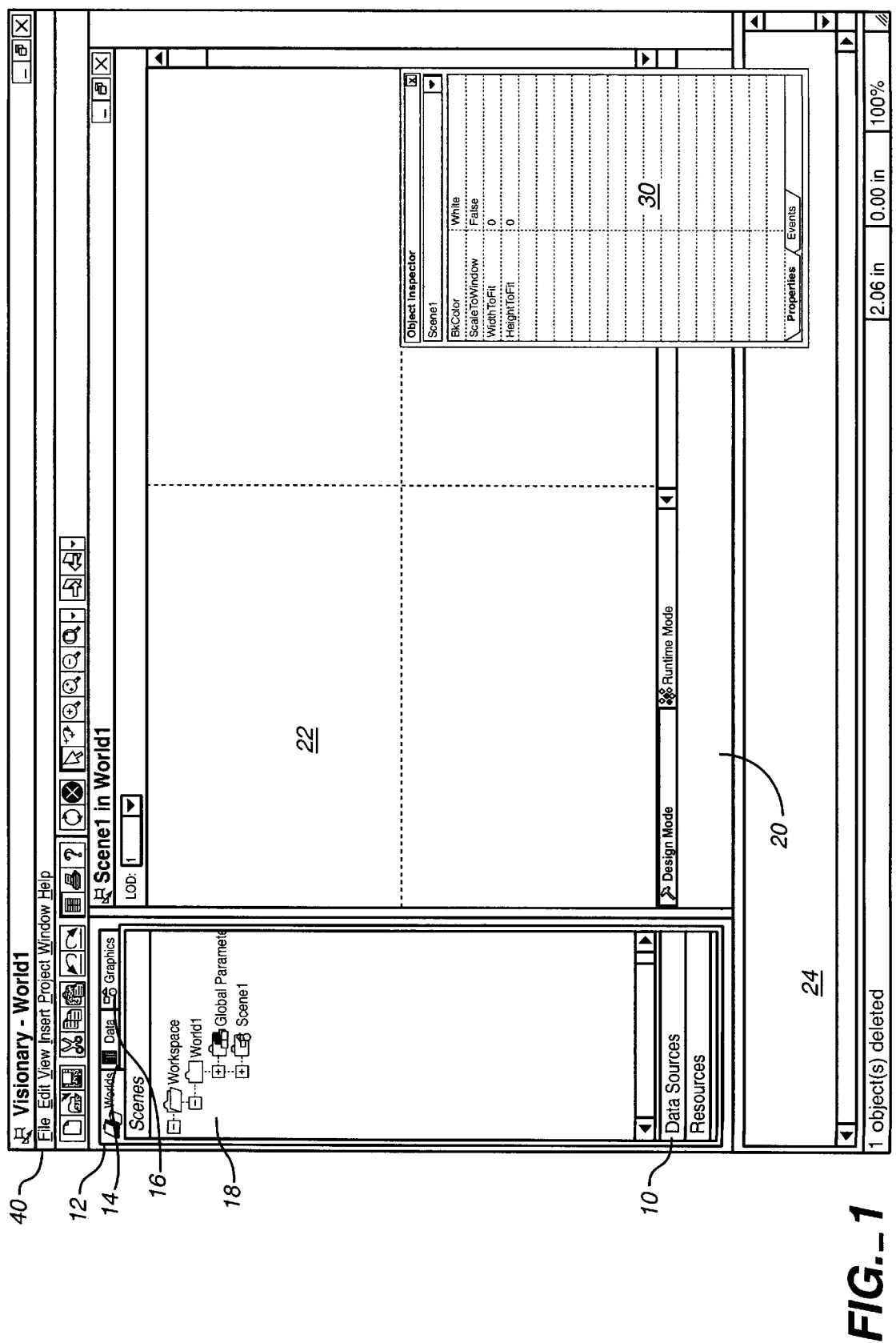
FIG._1

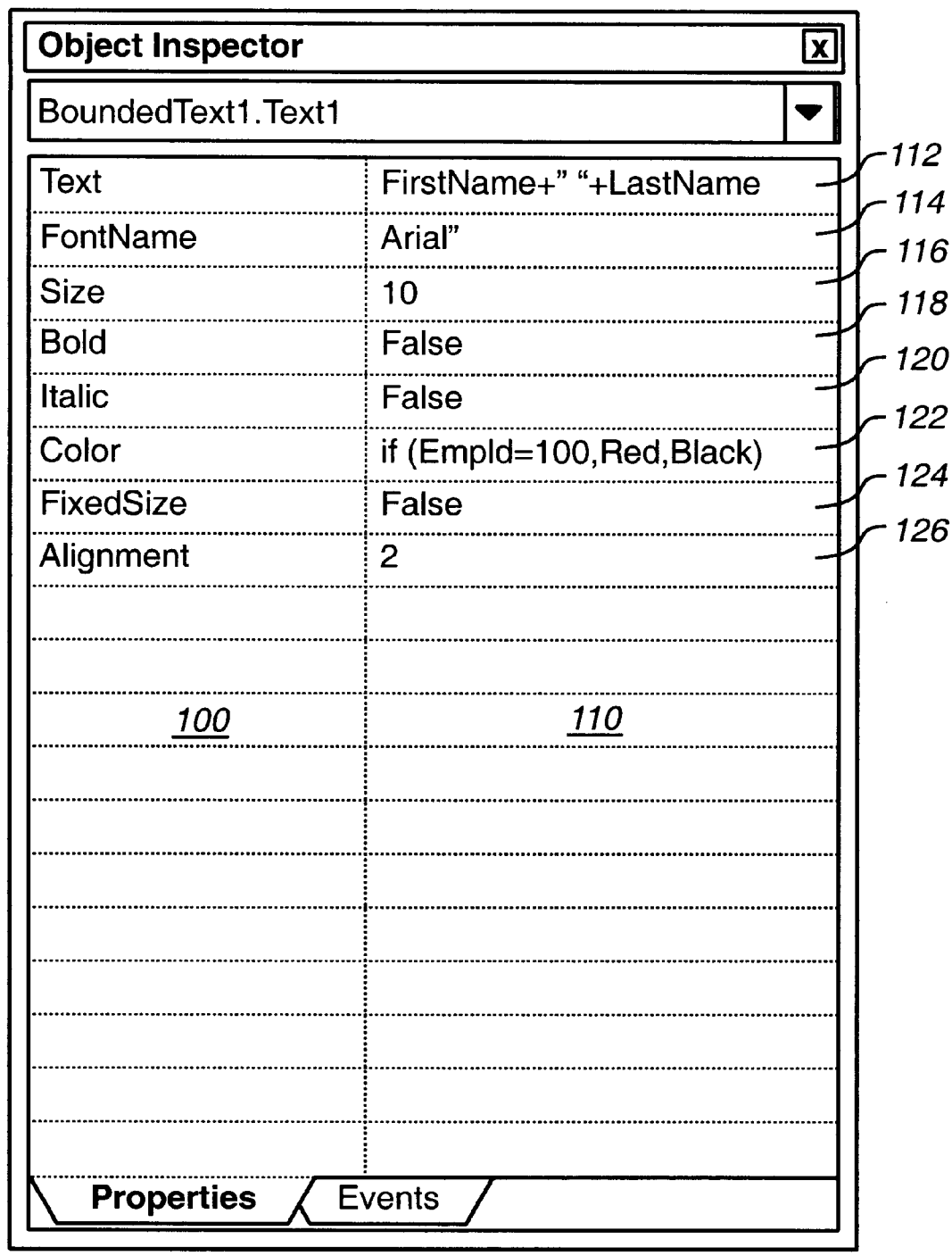
FIG._2

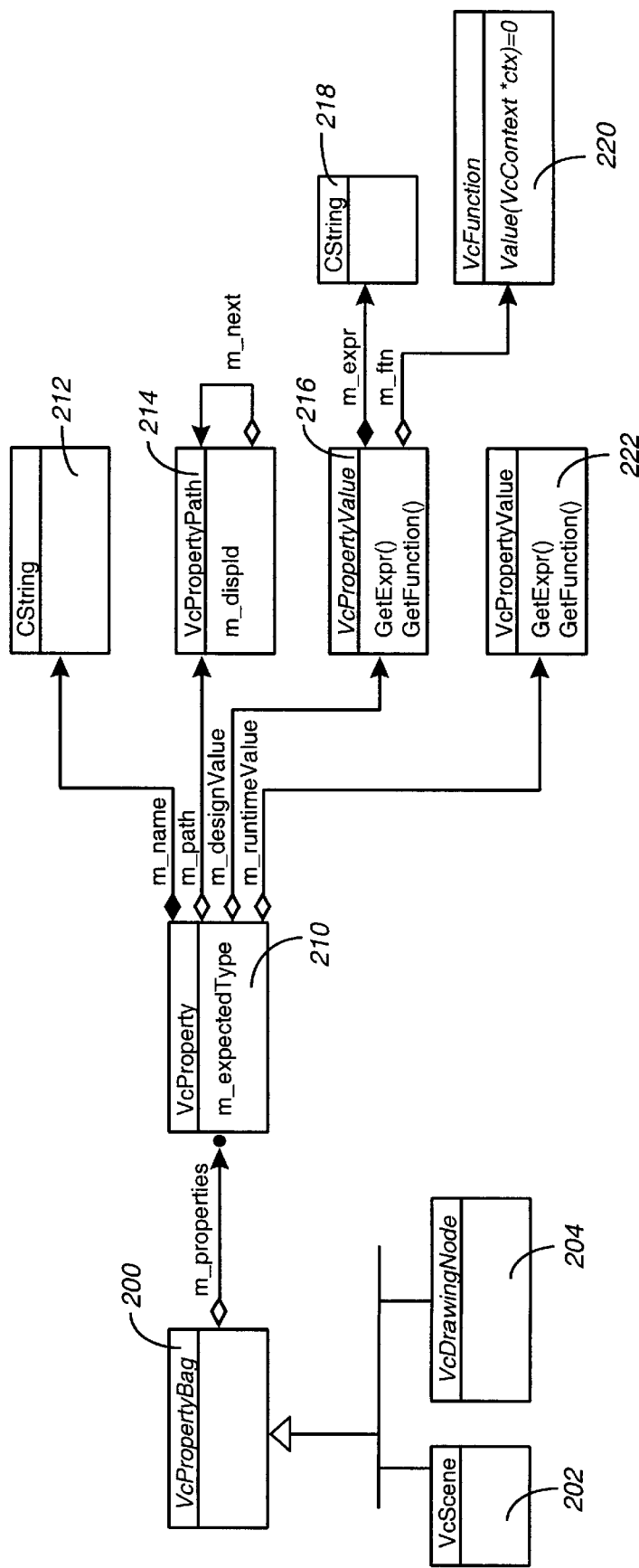
FIG._3

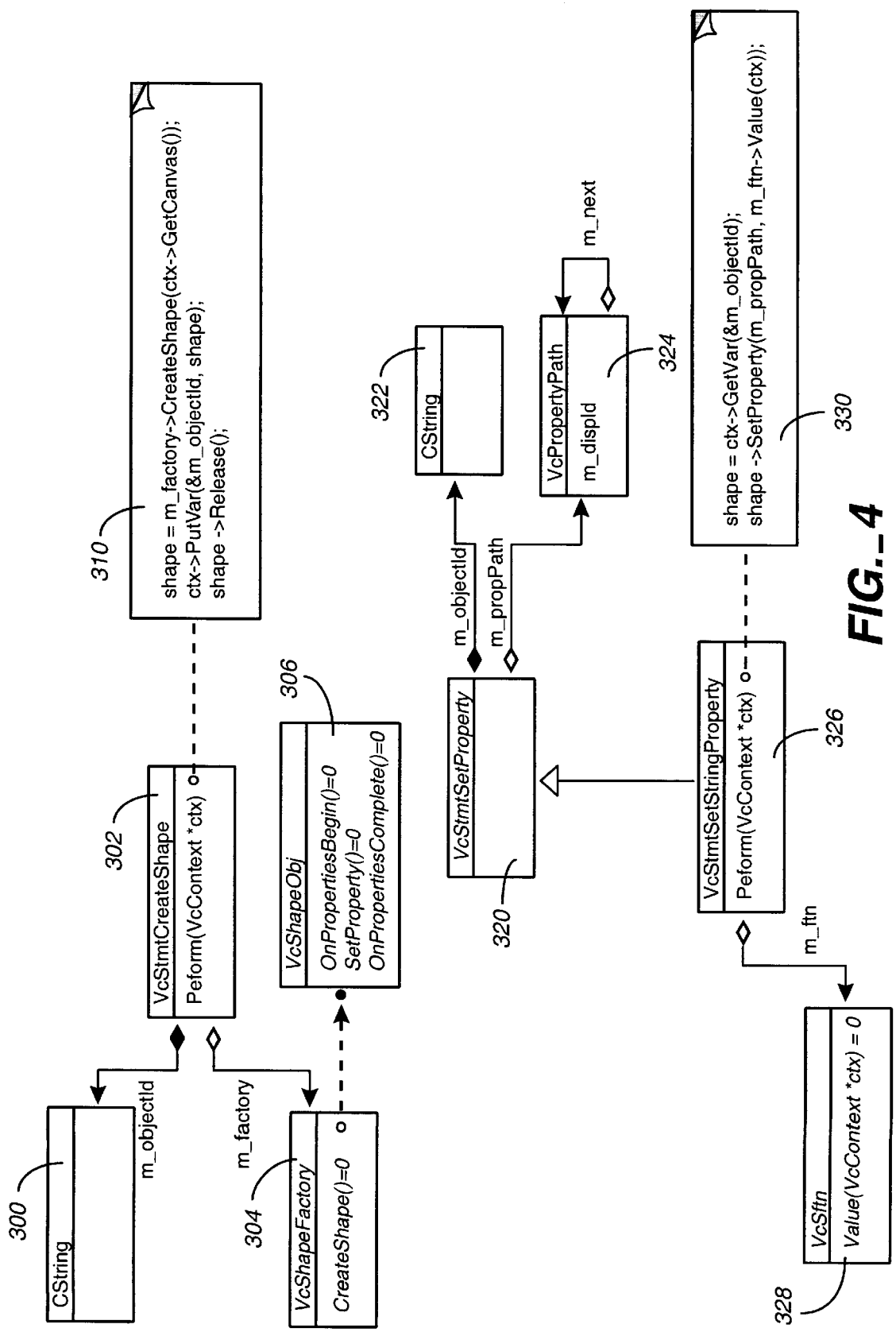
FIG._4

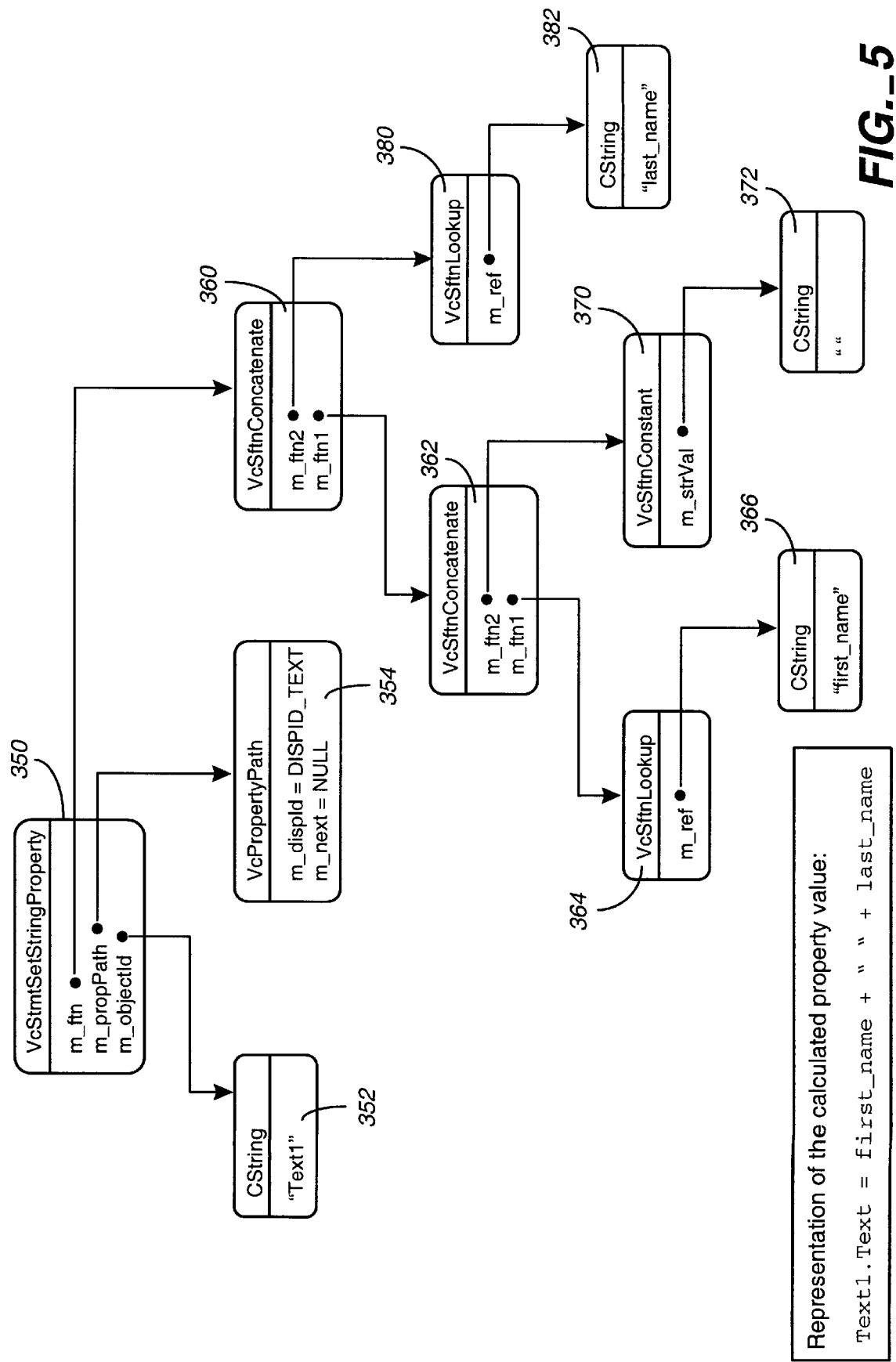
FIG._5

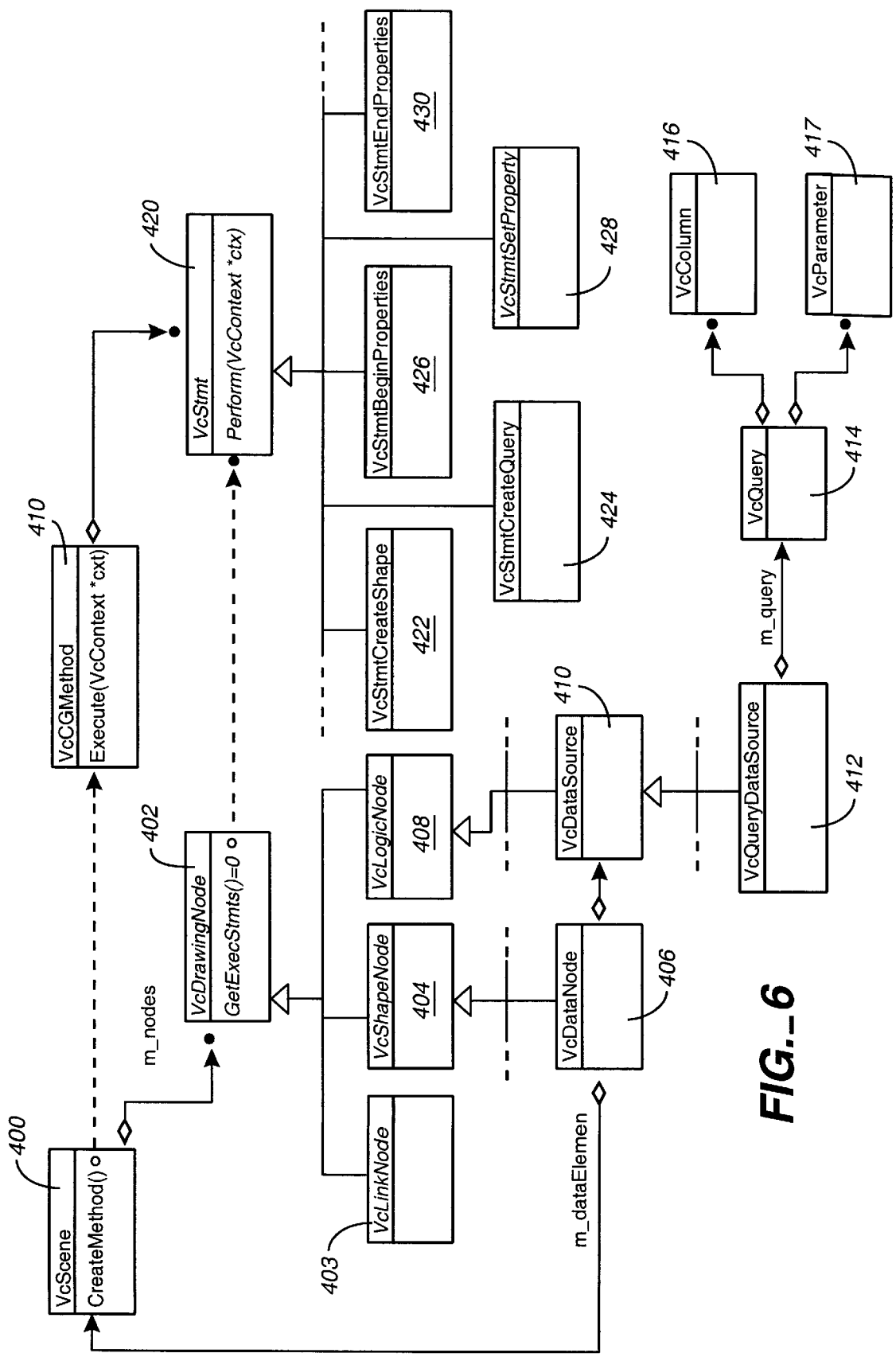
*FIG._6*

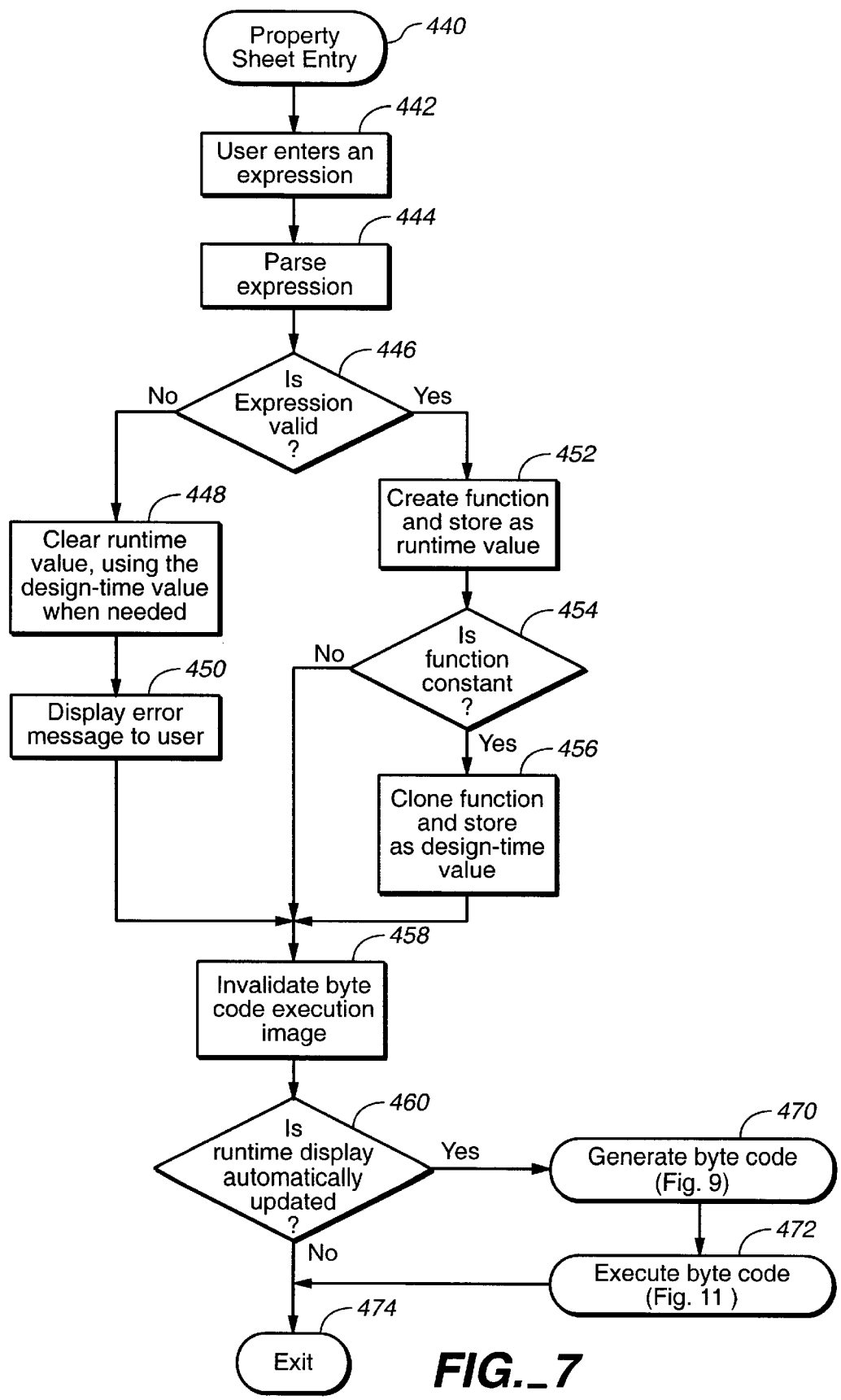
FIG._7

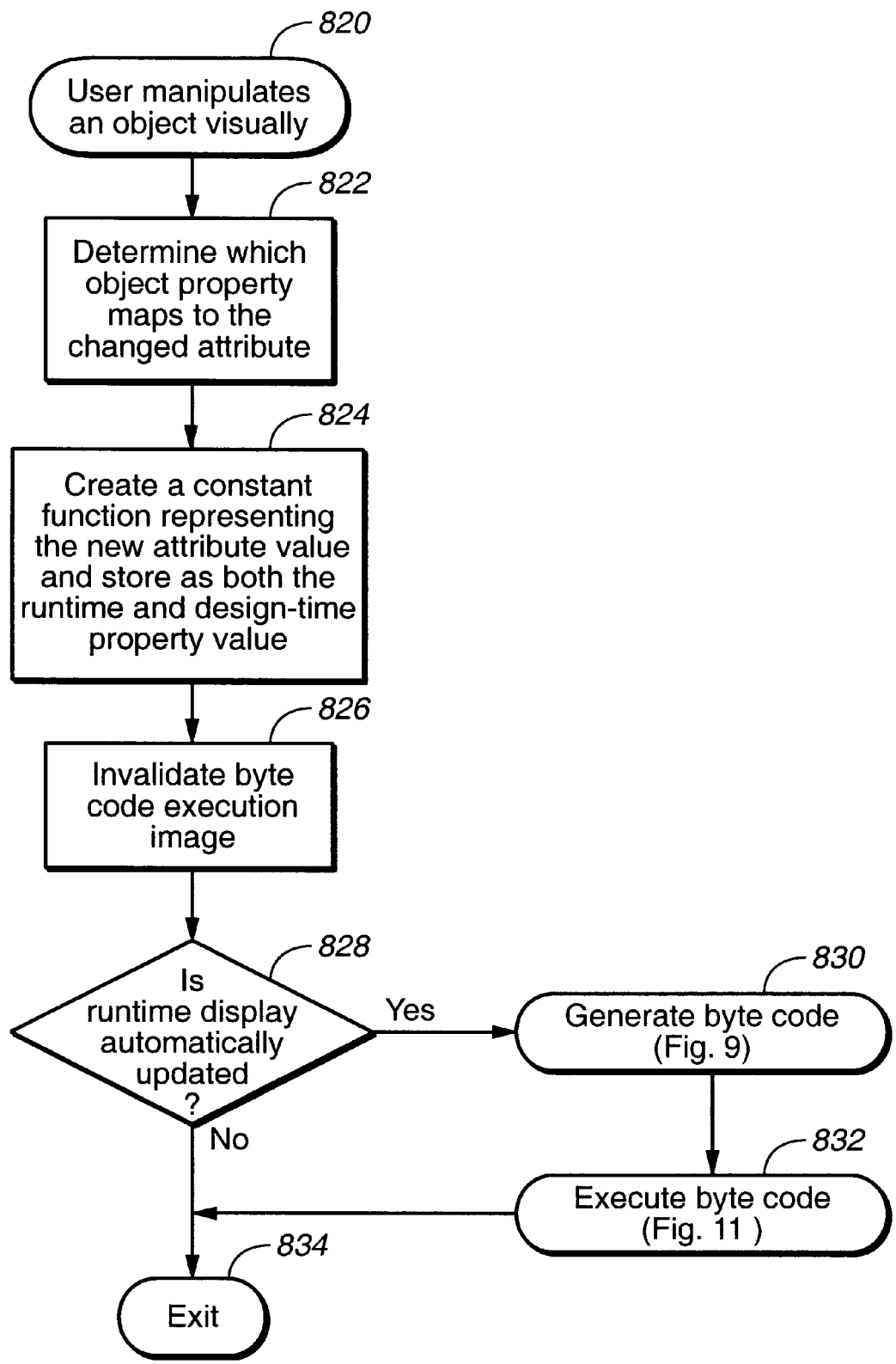
FIG._8

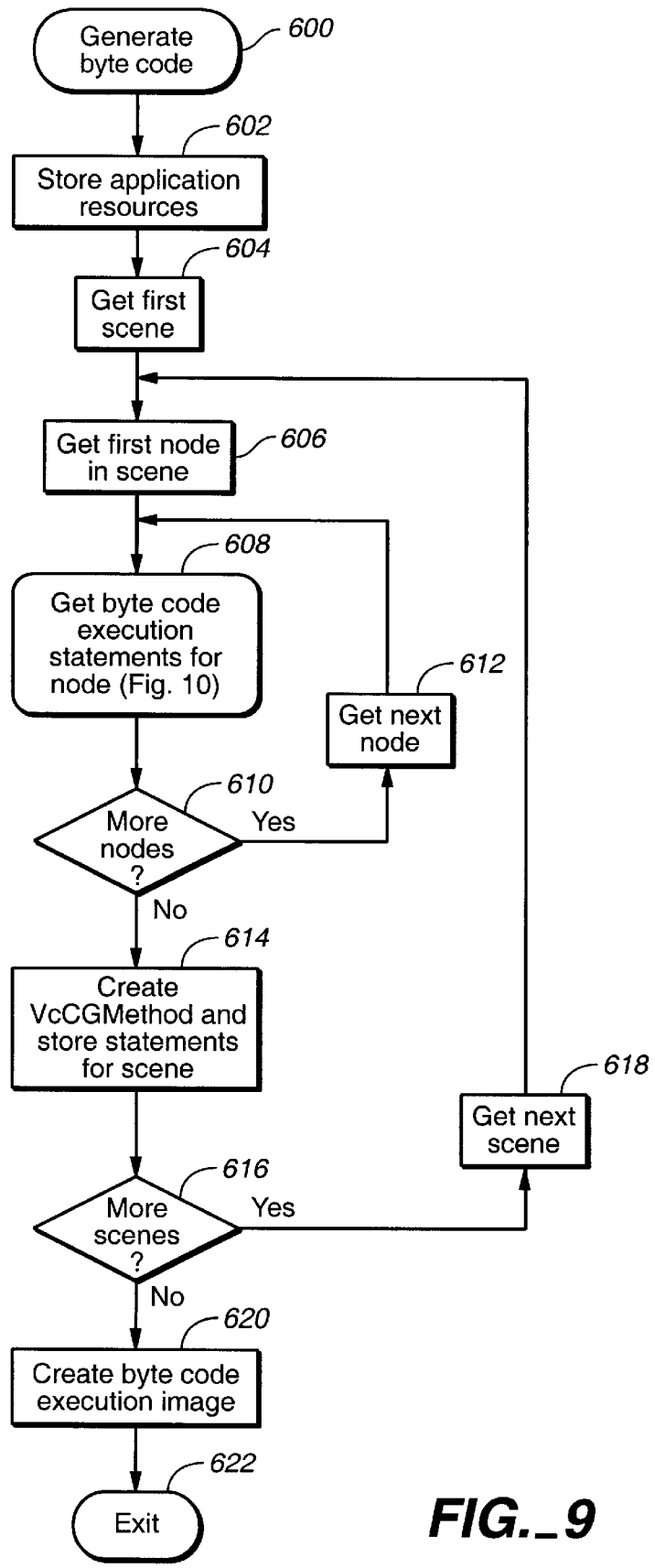
FIG._9

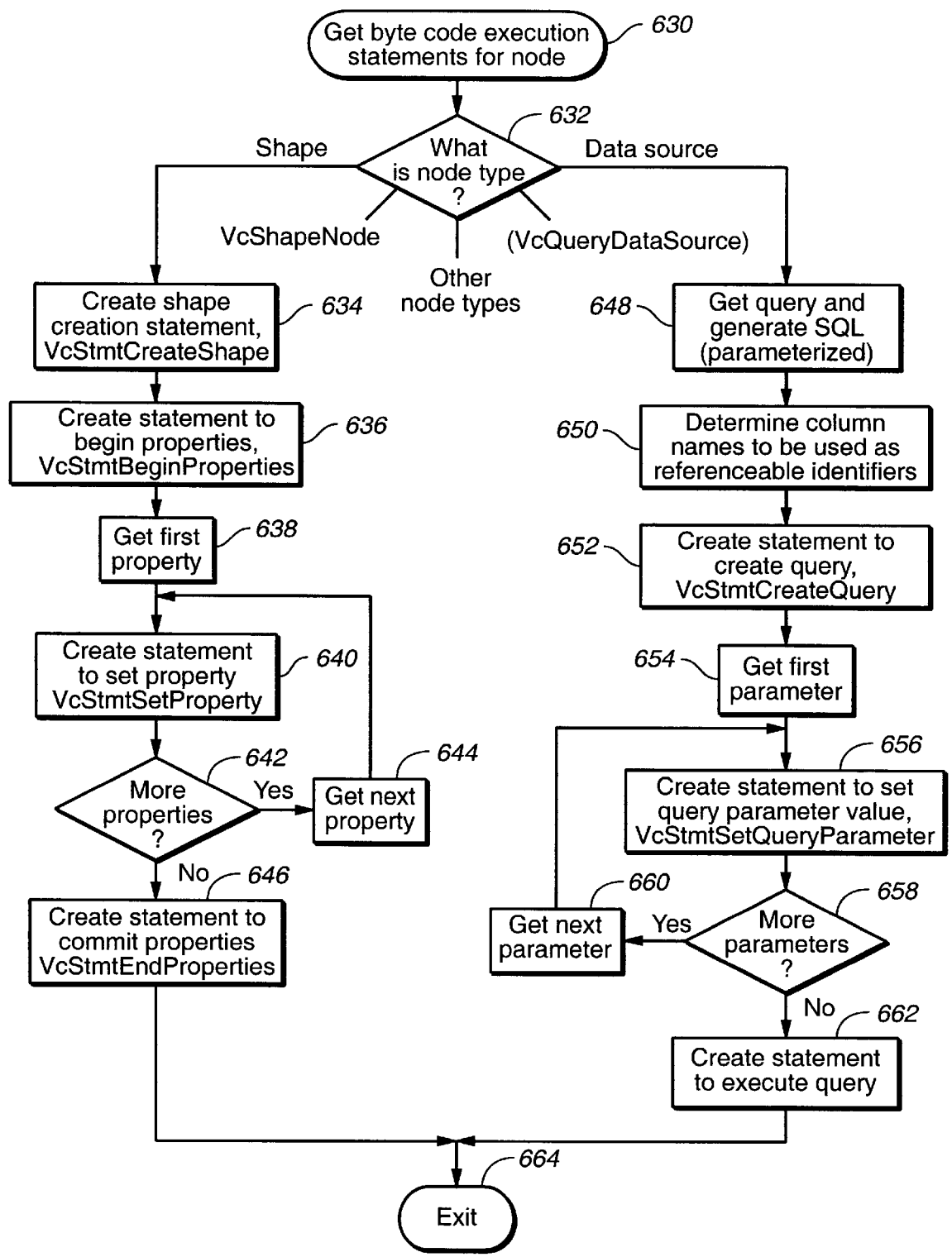
FIG._10

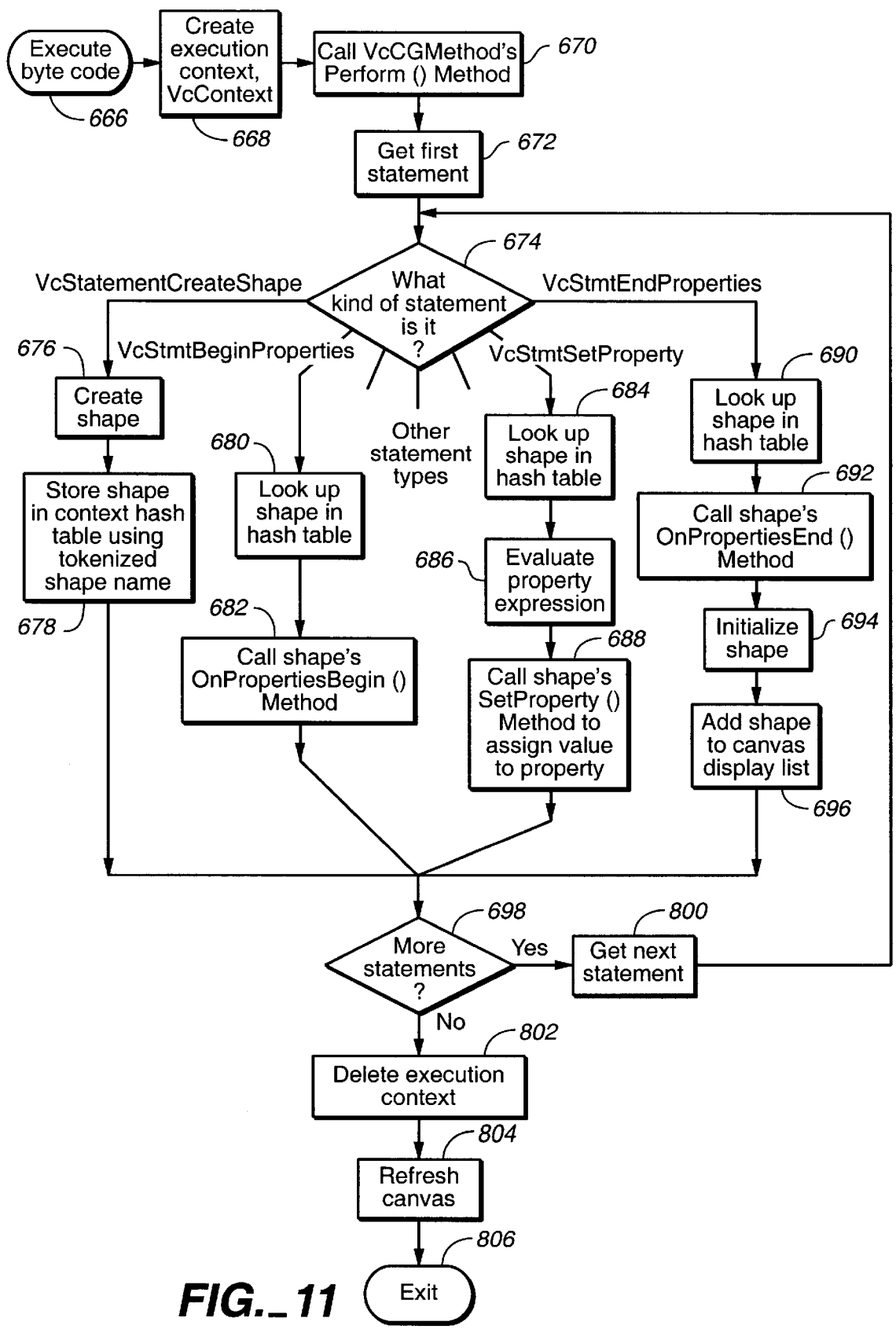
FIG._11

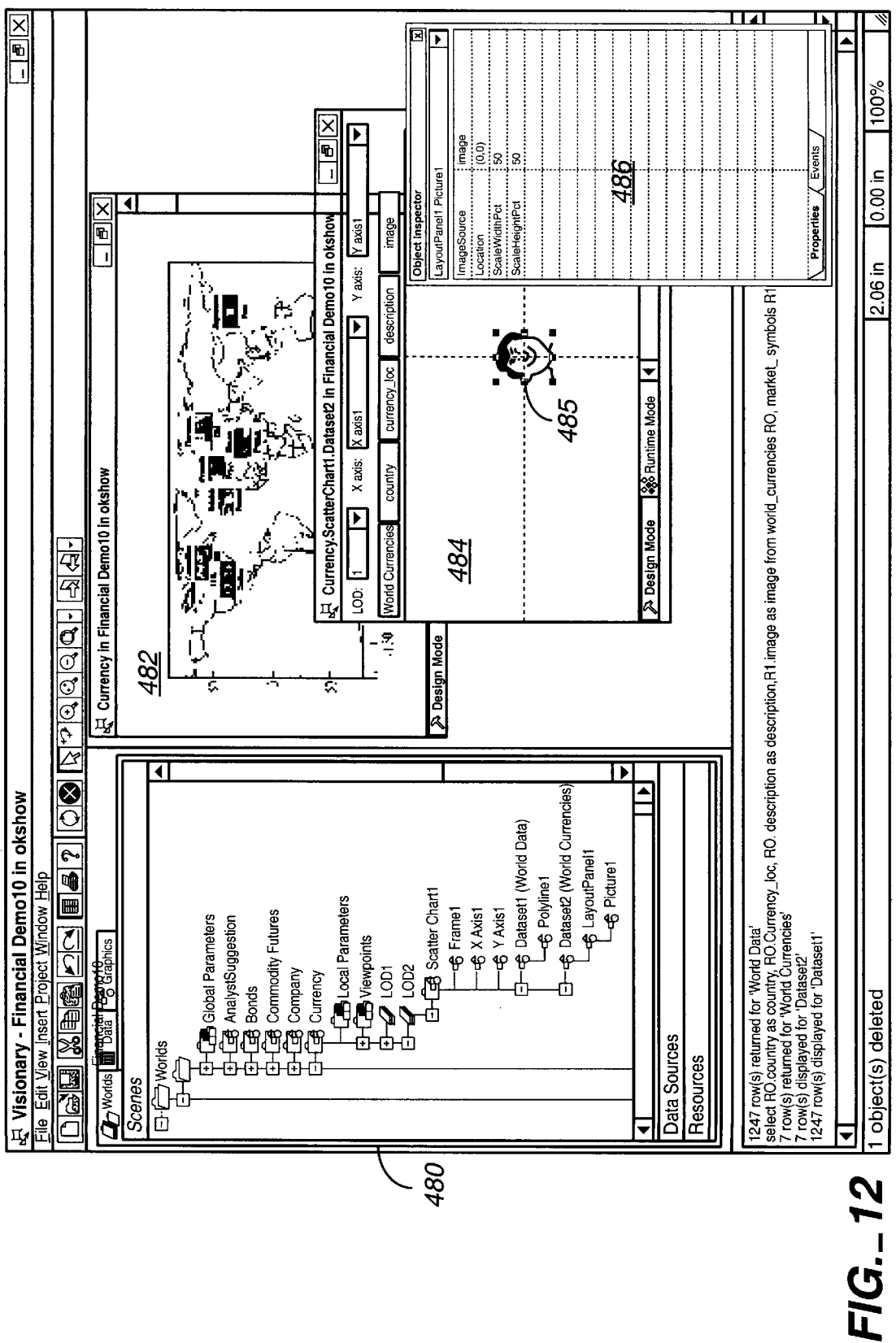
FIG._12

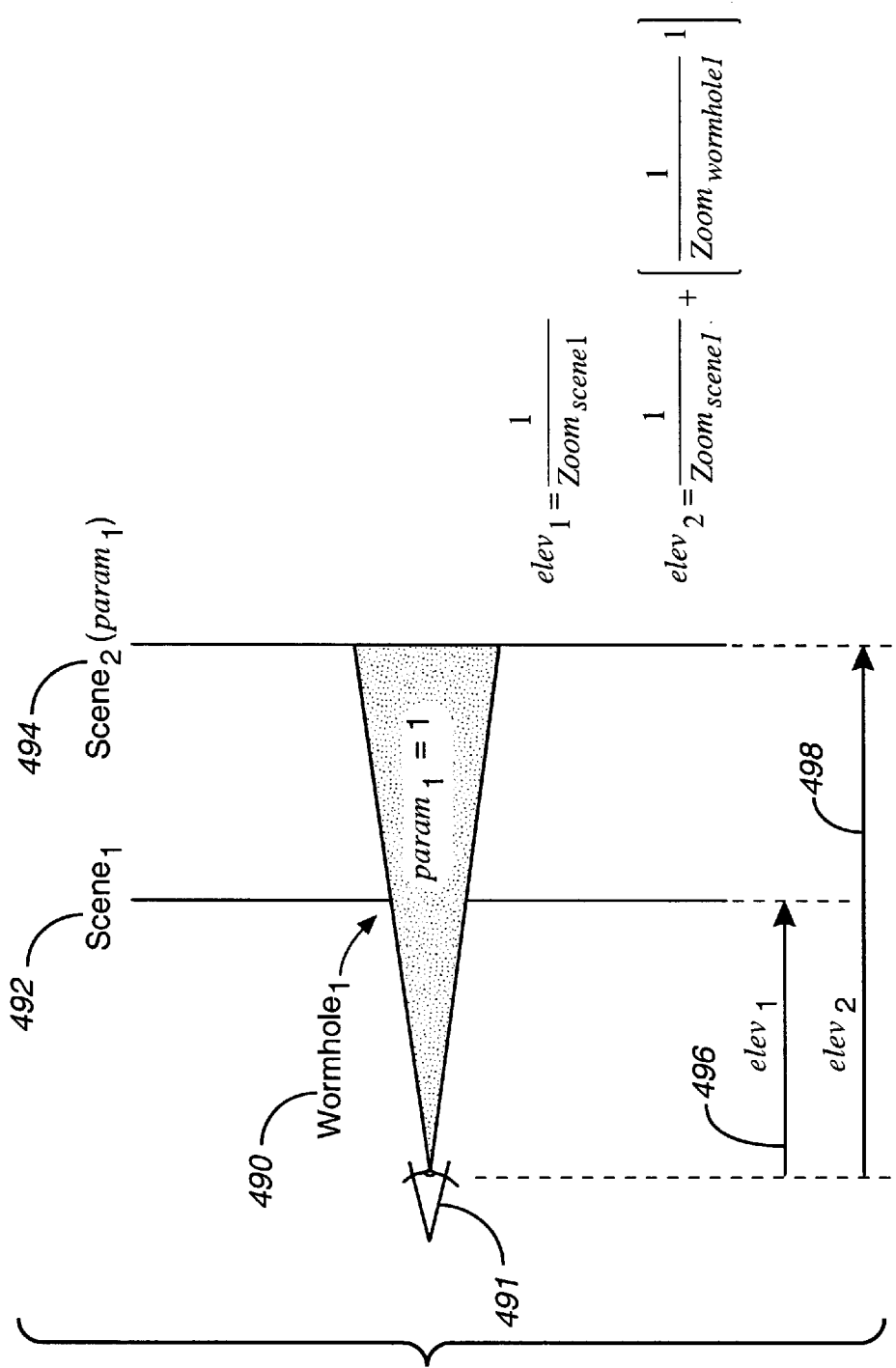
FIG._13

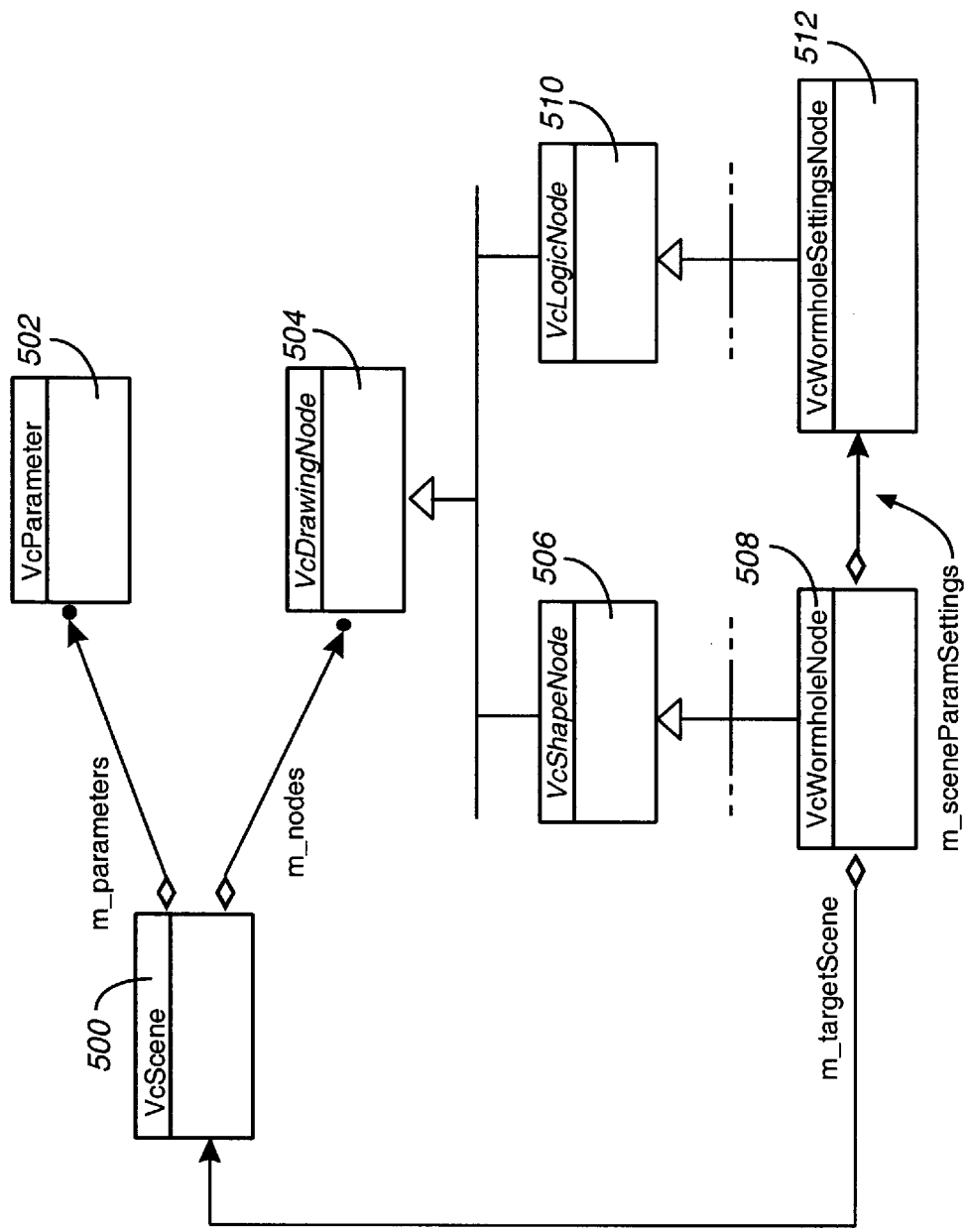
FIG._14

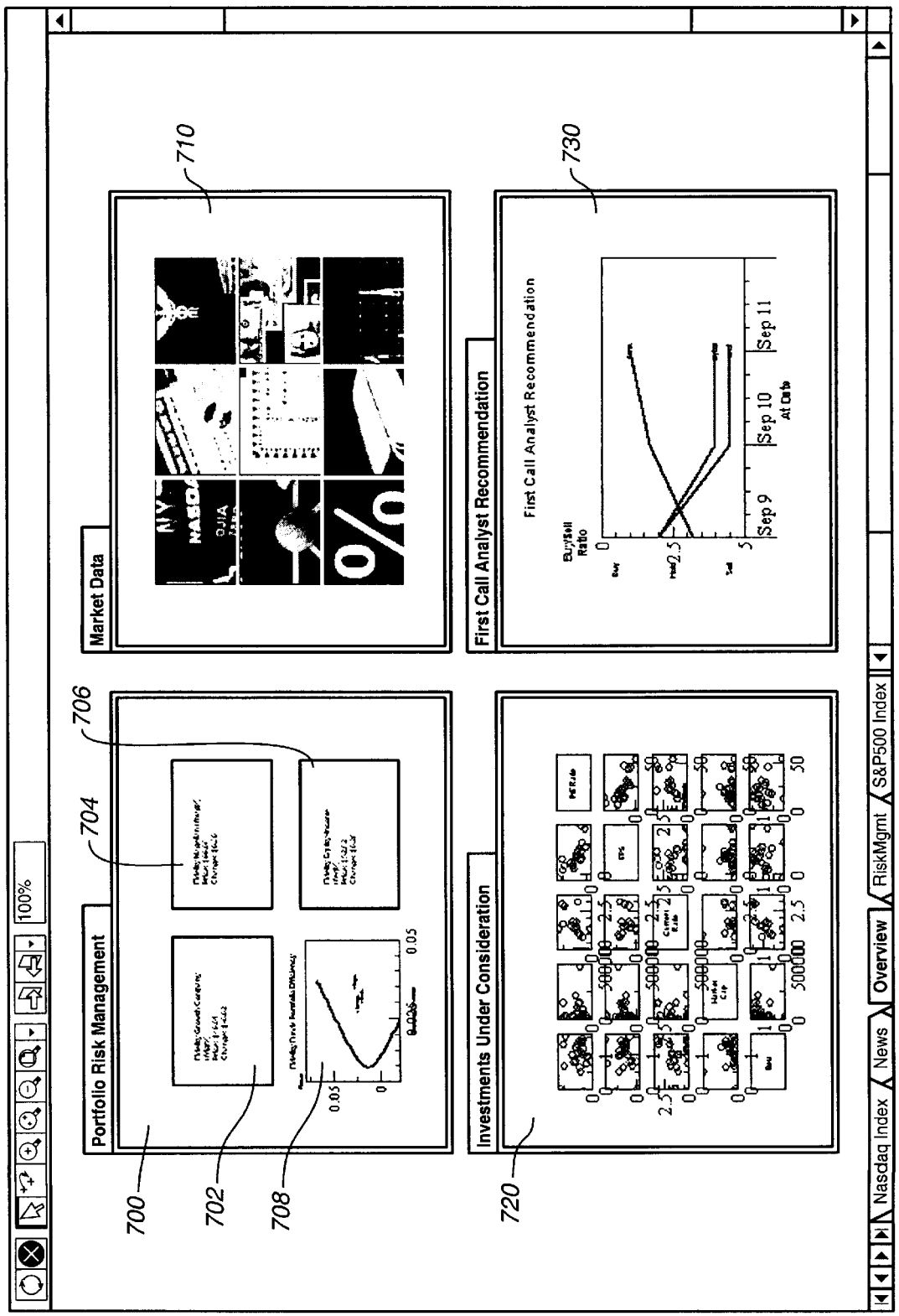
FIG._15

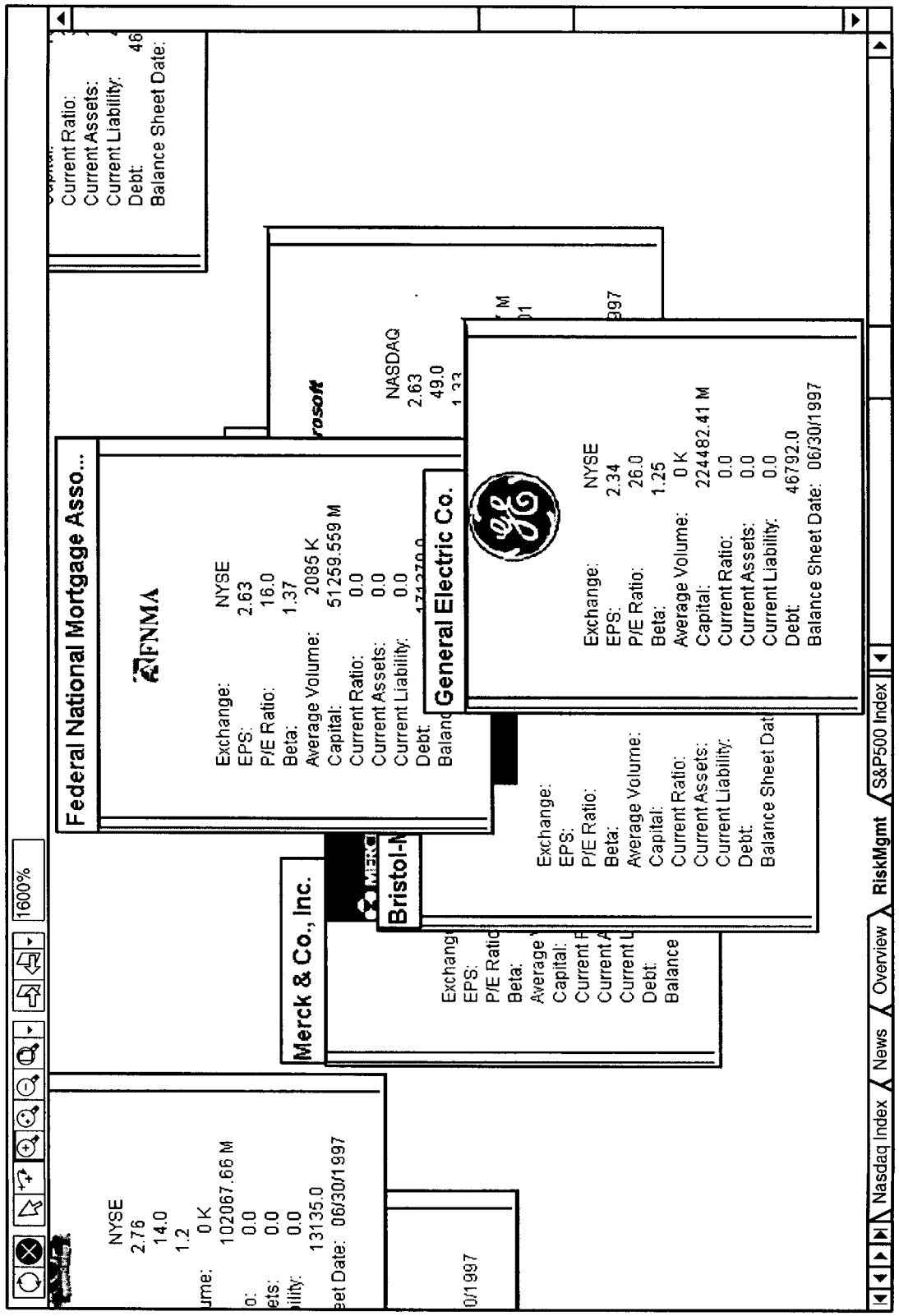
FIG._16

HYPERLINKED RELATIONAL DATABASE VISUALIZATION SYSTEM

BACKGROUND

The present invention relates to business intelligence tools for building applications on a database management system (DBMS).

The advent of powerful, yet economical computers made possible by advances in processor, memory and data storage devices has made computers an integral part of modern companies. An important class of application for these computers includes a DBMS where information is collected and organized according to a data model and searched using queries. The DBMS allows users to perform operations such as locating, adding, deleting and updating records stored in the computer without a detailed knowledge of how the information making up the records actually is stored in the computer.

One powerful type of DBMS is known as a relational DBMS where stored information appears to the user as a set of tables, each of which is termed a relation. In each relation, the information appears to be arranged in rows and columns, with columns of data being related to each other by one or more predetermined functions.

To access particular information in the relational DBMS, a query compiler converts a user request, typically expressed in a query language such as a Structured Query Language (SQL), into a set of operations to be performed on one or more input relations to yield a solution responsive to the user's request. Using the query language provided by the DBMS, the user may develop application programs which facilitate retrieval of the data from the DBMS, processing of the data, and organization of the data into reports.

One issue in developing business intelligence tools is the type of reports that the tool is to generate. Typically, the tool generates certain pre-formatted reports using the query language. Although the query language is easier to use then conventional programming languages such as Basic or C, the generation of each new report still requires a certain programming expertise and can often take a substantial amount of time.

SUMMARY

The invention provides user access to data through information spaces called scenes that allow the user to understand, view and navigate data. In one aspect, a hyperlink system is provided for viewing in context information associated with an application with a plurality of scenes from a viewpoint. The hyperlink system has a first scene having a first zoom factor from the viewpoint to the first scene; a second scene nested in the first scene, the second scene having a second zoom factor from the first scene to the second scene; and a wormhole projecting from the first scene to the second scene based on the first and second zoom factors.

Implementations of the invention include the following. The wormhole has an attribute property for setting the value of the one or more parameters associated with the second scene. The wormhole provides context information from each subsequent scene to each previous scene. Further, each scene may be displayed in one or more nested windows and may contain one or more objects representing the content of the database. The first elevation $elev_1$ may be determined in accordance with the first zoom factor $Zoom_{scene\ 1}$ as follows:

$$elev_1 = \frac{1}{Zoom_{scene1}}.$$

The second elevation $elev_2$ may be determined in accordance with the second zoom factor $Zoom_{wormhole}$ as follows:

$$elev_2 = \frac{1}{Zoom_{scene1}} + \left[\frac{1}{Zoom_{wormhole}} - 1\right].$$

Further, a query generator dynamically triggers queries to a database based on the first and second zoom factors. Additionally, one or more notification events may be generated as a user navigates the hyperlink system for triggering an object's behavior.

In a second aspect, a method for navigating a virtual world having a first scene and a second scene nested therein is disclosed. The virtual world has a wormhole projecting from the first scene to a second scene, each scene having one or more objects and each object having a behavior. The method involves interacting with the one or more objects; and generating notification events to trigger the behavior of the object depending on whether the object is viewed from the first scene or the second scene.

Implementations of the method include one or more of the following. The behavior is determined by setting the value of the scene or one or more global parameters. The object's behavior is determined by executing an action. Further, the first scene has a first zoom factor from a viewpoint to the first scene, the second scene having a second zoom factor from the first scene to the second scene, and wormhole projects from the first scene to the second scene based on the first and second zoom factors. The first elevation $elev_1$ is determined in accordance with the first zoom factor $Zoom_{scene\ 1}$ as follows:

$$elev_1 = \frac{1}{Zoom_{scene1}}.$$

and the second elevation $elev_2$ is determined in accordance with the second zoom factor $Zoom_{wormhole}$ as follows:

$$elev_2 = \frac{1}{Zoom_{scene1}} + \left[\frac{1}{Zoom_{wormhole}} - 1\right].$$

Additionally, the parameters include a global parameter, a scene parameter, or a query parameter. The method may dynamically trigger queries to a database based on the first and second zoom factors. The method also generates one or more notification events as a user manipulates the one or more objects.

Advantages of the invention include one or more of the following. The invention is a visual business intelligence tool for building applications that extend beyond the limitations inherent in conventional forms-based or report-based applications. Specialized programmers are removed from the application development process and users are moved closer to the data so that application development time is reduced. User interfaces can be created quickly and easily for information rich databases and for applications such as data warehousing and decision support.

The invention's hyperlinks provides context and "look-ahead" information to applications. This capability supports several powerful advantages in building data-driven applications. First, users can see through portals into other views of their data without losing the context of where they are. The navigational path taken by a user browsing the application can affect the application itself, thus providing dynamic customization of the application. In addition, context portals simplify the consolidation of diverse data sources in a single application. In the case of queries that are parameterized with parameters being set by the portal, it in effect provides universal, client-side query joins, allowing the data from different databases to be combined together in a meaningful way. As a result, context portals allow users to attain a greater level of understanding of their data and thus to make better business decisions.

The dynamic object properties simplify development of data-driven applications, enabling domain experts with no programming experience other than spreadsheet usage to use the tool create powerful applications easily. Dynamic object properties have several advantages over static object properties which are hard-coded into the application when compiled. The first is that the properties are seamlessly and automatically bound to data. Furthermore, the bindings are applied to an entire class of object (all objects represented by the data element node) rather than simply to a single object (i.e., the calculated value for each object is dependent upon the row represented by the object). Another advantage is that it eliminates the specialized coding that would otherwise be required to perform such simple tasks as to make the color of an object dependent on the value of a column or set of columns from a data source. Further, more than one property of an object can be tied to a column in one row (or even a computation performed on all rows). In contrast to conventional development tools where each object is limited to a single link, the invention allows each column or row associated with an object to be linked to a separate property.

The generation of code from a scene graph eliminates the need for manual programming, thus allowing developers to concentrate on the problem domain rather than the tool itself. As a result, a domain expert with no programming experience can rapidly create powerful applications. In addition, the scene graph representation provides a powerful way of browsing an application's contents and making organizational changes to an application as easily as re-ordering the outline for a document in a word processor.

Additionally, the invention allows the representation of individual data points to be edited as generally as the top-level scene itself. This capability allows powerful applications to be created which support drill-down and exploratory navigation. This navigation allows users to attain a greater level of understanding of their data and thus to make better business decisions.

Other features and advantages will be apparent from the following description and the claims.

DESCRIPTIONS OF THE DRAWINGS

FIG. 1 is a multiple-document interface for editing one or more worlds.

FIG. 2 is a diagram illustrating an object inspector.

FIG. 3 is a diagram illustrating a property object model of an abstract base class VcPropertyBag.

FIG. 4 is a diagram illustrating two byte code execution classes, VCStmtCreateShape and VcStmtSetProperty.

FIG. 5 is a diagram illustrating a sample parsed property function.

FIG. 6 is a diagram illustrating an object model of a code generation process from a scene.

FIG. 7 is a flowchart illustrating a property sheet entry process.

FIG. 8 is a flowchart illustrating a process for visually manipulating an object.

FIG. 9 is a flowchart illustrating a process for byte code generation.

FIG. 10 is a flowchart illustrating a process for obtaining byte code execution statements for a node.

FIG. 11 is a flowchart illustrating a process for executing byte code.

FIG. 12 is a diagram illustrating a graph editing system.

FIG. 13 is a diagram illustrating a wormhole.

FIG. 14 is a diagram illustrating an object model of a wormhole.

FIGS. 15 and 16 are diagrams illustrating exemplary wormhole usages.

DESCRIPTION

A visual business intelligence system for building applications will now be described. In this system, a developer interactively builds a virtual world, whose building blocks include scenes, data sources, global parameters, and resources. A scene is a visual display of information much like a presentation slide, except that the information may be linked to data stored in a database. Within a scene, values resulting from a data source are represented graphically as user-defined data elements. Data sources are built with a block diagraming tool which generates one or more database queries. The queries can be SQL queries. Scenes are created with a drawing editor which transparently binds data sources to the graphical elements of the scenes. When the virtual world is completed, an execution image of the virtual world may be represented as byte code or a high level code which may be subsequently interpreted. The byte code representing the virtual world may be executed by a runtime control such as an ActiveX control. The runtime control may be embedded in a Web page or in any applications supporting the Active-X control such as Visual Basic, C or C++.

A scene may have one or more objects. Objects in a scene are described by a set of properties and may be assigned actions which are triggered by events such as clicking, user proximity to the scene, and mouse location. A viewpoint is a 3-dimensional location for viewing a scene. The location is described in terms of the user's current cursor X and Y offset from the center of the scene and the user's current zoom level (often referred to as magnification level). A viewpoint can be assigned a unique name and saved for facilitating navigation within a world. Named viewpoints can be used for manual navigation by the user or can be used as the target for an event-based jump action.

A data element is the graphical representation of a row resulting from a query. It is always associated with a layout and data source, and it is constructed much like a scene. It may contain any combination of objects, including layouts and wormholes to other scenes. Properties for objects making up a data element may not only reference scene parameters, but may also reference column names in the associated data source.

Scenes and data elements may be represented differently as a function of the user's zoom level. Each representation is called a level of detail (LOD), and is visually mutually exclusive from other LODs. For example, an object that starts off represented by a single dot may change into an icon as the user zooms closer, and then into a chart as the user zooms even closer.

Transition points between levels of detail are defined manually by the user in terms of zoom factors. A scene or data element may have N−1 transition points for N levels of detail. Visibility can also be controlled on a per-object basis by setting a "Visibility" property to a conditional expression such as If (UserZoom>2, true, false)

Thus, transition regions may be created where alternate representations overlap for certain ranges of zoom levels rather than being mutually exclusive. Overlapping may be particularly important in the creation of layered maps containing multiple data elements. Furthermore, more complicated expressions can be used to control visibility to achieve other effects.

Data sources can be named SQL queries that may be parameterized by one or more identifiers that are set at runtime. As data sources are defined, they are named and added to a world and displayed in the data sources category of the World Manager. They are then available for execution. The results can be browsed in a data sheet or used in a layout. When used in a layout, each row resulting from the query is transformed into a graphical representation represented by a data element. Columns in the resulting data source may be linked to attributes of objects contained in the data element. Parameters present in the data source query may be associated with a global program variable, with a local scene parameter, or with a column in a data source higher in the world tree hierarchy.

FIG. 1 shows a multiple-document interface for editing one or more worlds simultaneously. The principal portions of the user interface are a World Manager window 10, project workspace and editor window 20 and 22, an Object Inspector 30, a control bar 40, and an output window 24.

The world workspace is a background area that contains the editor windows. Four types of editor windows are provided. A graphical drawing editor called a scene editor is provided for composing a top-level scene. A graphical drawing editor called a data element editor is provided for defining the representation of each data point in a layout. A tool called a query editor is provided for defining SQL queries, either by constructing a graphical block diagram of the query or by directly entering the SQL manually. The query editor also provides a datasheet for viewing the results of a query. Additionally, a world editor is provided which shows two views of a complete virtual world: the first is the world structure view showing the navigational hierarchy of the world along with parameter linkages, and the second is a read-only pseudocode view providing documentation and search capabilities for the complete world.

The World Manager window 10 is the principal interface for editing and managing a user's open world(s). It has a dockable control bar with tabs 12, 14 and 16 and corresponding panels of information. When the user clicks on a tab, the tab is moved to the top and an underlying panel is shown. Each panel in turn presents a set of buttons, for displaying categories of information. The clicking of a button displays the category of information associated with the button. The Graphics tab 16 presents a categorized palette of all graphical objects that can be added to a scene or data element.

The World Manager 10 may be docked to either the right or left of the workspace 20. In its docked state, it may be stretched horizontally to enlarge or reduce the dimensions of the panels. In its floating state, it may be stretched both horizontally and vertically.

In the example of FIG. 1, one tab called a Worlds tab 12 displays three separate views of the structure and hierarchy of the worlds currently open. Each open world is displayed underneath the main workspace item in a tree control 18. A context menu is available for each item displayed in a tree control and provides a list of common menu commands for the selected item when a right mouse button is clicked.

In this example, a scenes category displays global parameters and scenes contained within each open world. Global parameters are identifiers which may be referenced anywhere within the hierarchy of any scene in both object properties and event actions. Underneath each scene is a list of its local parameters (if any) and viewpoints, along with the levels of detail for the scene and a hierarchical list of the objects that comprise each level of detail. Each level of detail is mutually exclusive from the others when viewed. In other words, only one level of detail is visible at a time. The order of the objects in the tree beneath a level of detail determines their drawing order. Objects displayed underneath other objects are called child objects, and their owners are called parent or composite objects. Certain items in the tree may reference other items in the tree such as a wormhole (discussed below) which references another scene, or a data element which references a data source in the tree for the data sources category.

The data sources category displays a list of queries contained by each open world. Each data source in turn contains a list of query parameters, column names or aliases, and a diagram if the query diagram editor was used to construct the query. When present, query diagrams contain the list of blocks and connections used in their construction. The resources category displays a list of execution resources that may be used in the computation of property values for scenes and their graphical content (nodes). The basic resource types may include colormaps, color sequences, stock images, and user classes.

The data tab 14 contains two categories of information: Query Design, which provides a palette of elements to be used in constructing a query diagram; and Database Contents, which allows the contents of an active database schema to be browsed. The contents of the query design category may be presented in palette form. The database contents category may be presented in tree form where column names underneath each table and view may display the name of the column and its type, separated by a double colon (for example, "employee_name::varchar"). The database contents tree can be used to browse the active schema.

Each open world may contain zero or more open editor windows. Each of the four types of editors may display a unique icon, followed by text describing the type of editor and the editor's contents. The format of the text may be in an abbreviated format or an extended format as follows:

EditorType: Contents or

EditorType: WorldName [.ExtendedContents], where EditorType is the type of editor ("Scene", "Data Element", "Query", or "World"), WorldName is the name of the world containing the contents, and Contents is the short name for the object being edited (for example, "DataElement1"), and ExtendedContents is the long name for the object being edited that includes the tokenized names of all parent objects, separated by periods (for example, "Scene1.ScatterChart1. DataElement1").

More than one editor window may be opened for a given part of a world. For example, the same scene may be edited in one editor at 100% magnification to see the entire scene, while another editor may be zoomed in to a smaller portion of the scene. A change to the scene in either editor may be reflected in both windows.

The scene editor window is used for graphically editing and debugging the contents of a top-level scene. The editor has two modes: a design mode and a runtime mode. In design mode view, objects are added from the graphics palette and displayed without the execution of any queries. Objects that are bound to data sources through one or more property values are represented by placeholder objects. In addition, no object events are generated, so any actions associated with objects are not executed. Scenes may be edited at any zoom level, which may be set from the navigation toolbar.

The design mode view provides two optional docking toolbars: a Selector Bar and a Parameter Bar. Scenes may be represented differently at different zoom levels, where each representation or drawing defines a LOD. The selector bar provides control over which LOD is currently being edited. The parameter bar displays a button for each parameter in the scene. If a scene has no parameters, the bar is not displayed unless it has been manually turned on from the View menu. The parameters displayed in the palette may be used in the Object Inspector for setting the value of an object's properties. The parameter bar may be updated automatically when parameters are created, deleted, or edited.

When the runtime mode is selected, the scene contents are compiled into byte code and then displayed, as discussed below. Any associated queries are executed, object events are generated, and associated actions are performed. The runtime mode supports full navigation capability, so wormholes or jump links to other scenes are accessible. If a jump is made to another scene, the design view is also switched to the new scene. The runtime mode may be viewed simultaneously during edit operations in the design view by opening a second window. Multiple runtime views displaying the same scene operate independently and may not be slaved together. Each view has its own copy of global parameters which may be reflected in the world scenes tree for the active runtime view.

The data element editor window is used for graphically editing the representation of a data point resulting from a query. The data element editor window is shown in the design mode in FIG. 12. Both the selector bar and the data sources bar are visible.

Similar to the scene editor window, the data element editor has two modes: design mode and a runtime mode. In the design mode view, objects are added from the graphics palette and displayed without the execution of any queries. Objects that are bound to data sources through one or more property values are represented by placeholder objects. In addition, no object events are generated, so any actions associated with objects are not executed. Data elements may be edited at any zoom level, which may be set from the navigation toolbar.

The data elements may be represented differently at different zoom levels, where each representation or drawing defines an LOD. In addition, different objects in the data element may be associated with different axes. For example, a stock chart with volume-of-trading bars may have two Y axes. The data element for each trade day may have a high/low/close bar associated with the price axis and a volume bar associated with the volume axis. The selector bar provides control over which LOD and set of axes may be edited. The parameter bar displays a button for each parameter in the scene. The parameters displayed in the palette may be used in the Object Inspector for setting the value of an object's properties. The parameter bar is updated automatically when parameters are created, deleted, or edited.

The data sources bar displays a strip of buttons for each data source within scope of the data element. Each button corresponds to a column name that may be used in the Object Inspector. For a simple layout, a single data source is displayed. For nested layouts, a row may be displayed for each query. A query is considered in scope if the associated data element object exists as an ancestor to the data element in the world scene tree. The data sources bar may be updated automatically when data source columns are created, deleted, or edited.

The query editor offers three views of a query: the data sheet which displays the results of a correctly formed query; the query diagram view which provides a block diagram of the query structure; and the SQL view, which displays the actual SQL text. The user may switch between views by clicking on one of the corresponding mode buttons at the bottom of the window to the left of the scrollbar.

The data sheet view is a read-only view which shows the tabular results of the query. If the query is parameterized, the datasheet may only be available when a default value is available for each parameter contained in the query. The data sheet may be viewed simultaneously during edit operations in the query diagram or SQL text view by opening a second window. Changes to the query may cause the data sheet to be refreshed interactively. When data sheet mode is not selected, it may not be refreshed with changes to the other views. Rows are loaded into the datasheet when they come into view.

The user adds blocks to a query diagram by selecting them from the data tab of the World Manager or from the Insert menu. Blocks are connected by clicking on the output port of the source block and the input port of the target block. Alternatively, blocks can be connected by dragging the mouse from one of the ports to the other with a resulting "rubber-banding" connection line displayed until the user releases the mouse button. In either case, the cursor may be changed between port selection actions to denote the connection operation.

The SQL view allows arbitrary SELECT queries to be created and edited. It also allows editing of the expression generated by the diagram editor. However, if the SQL is edited, the diagram may no longer be available. In this case, a confirmation dialog may be displayed to warn the user.

The world editor provides two views for interacting with the virtual world: a structure view and a pseudocode view. The world structure window displays a hierarchical view of the organization for a complete world. Each box under the World root box corresponds to a scene. Boxes beneath the scenes correspond to data elements or other scenes connected by wormholes. Double clicking on any of these boxes may open the corresponding scene or data element editor. The links between boxes represent hierarchy in the world scene tree.

A box may have one child box for each data source and wormhole contained in its graphical content. Depending on the structure of a world, the depth of the tree may be infinite. For example, if a scene contains a wormhole to another scene which in turn contains a wormhole back to the first, the tree may contain an infinite vertical sequence of the first and second scene. As a result, the tree may only expand a level when explicitly expanded by the user.

Each link and the box(es) underneath it may be displayed or hidden by clicking on the button at the top of the link. When initially displayed, the world box may be expanded to display all scenes contained by the world. As boxes are expanded, the tree structure may adapt to make room for newly-exposed boxes.

The parameterization of a world is also displayed in the structure diagram. Global parameters, scene parameters, and query parameters are displayed as text boxes which extend to the left of the box denoting their role as inputs, while query columns are displayed as text boxes which extend to the right of the box denoting their role as outputs. As parameters and column names are added, deleted or modified in other editor windows, the boxes are updated to reflect the change.

When a scene or query parameter is set to a parameter or column higher in the hierarchy, the parameter's text box is shown "wired" to the source value. These connections can be edited in the structure diagram. To establish a new connection and set the value of a parameter, the input connection point for the parameter and the output connection point for the source parameter or column are clicked with the mouse (in either order). Alternatively, connection points can be connected by dragging the mouse from one to the other with a resulting "rubber-banding" connection line displayed until the user releases the mouse button. In either case, the cursor may changed between selection actions to denote the connection operation. Note that the source must exist higher in the tree hierarchy for a valid connection to be established. To eliminate the link, the user selects the link and then presses the delete key.

The pseudocode view provides a read-only view of the entire contents of a world in text format. The pseudocode may display an initial header consisting of the world name and the initial scene, followed by the following sections:

Global parameters
User classes
Colormaps
Color sequences
Stock images
Database connections
Data sources
Scenes In one implementation, sections are surrounded by a pair of dashed lines as follows:
SectionName:

In addition, data sources and scenes are separated by a single separator line:

The succeeding sections display the format for each pseudocode element. Note that square brackets ('[' and ']') denote optional text, vertical separators ('|') denote alternatives.

Global parameter format
  DataType ParamName [(Built-in)]
  Description: Description
  Default value: (None)|Value
  Access: [Private|Public]
User class format
  ClassName
  Parent classes:
  (None)|ParentClass1
  . . .
  [ParentClassN]
Colormap format (discrete colors):
  ColormapName
  Discrete colors:
  ColormapName(below BL)=valueL [(ColorName)]
  . . .
  ColormapName(Bi-Bi+1)=valuei [(ColorName)]
  . . .
  ColormapName(above BU)=valueU [(ColorName)]
Colormap format (blended colors):
  ColormapName
  Continuous colors (blended):
  ColormapName(below BL)=valueL [(ColorNameL)]
  . . .
  ColormapName(Bi)=valuei [(ColorNamei)]
  . . .
  ColormapName(above BU)=valueU [(ColorNameU)]
Color sequence format:
  ColorSeqName
  ColorSeqName[0]=valueo [(ColorNameo)]
  . . .
  ColorSeqName[N-1]=valueN-1[(ColorNameN-1)]
Stock image format:
  ImageName
  Format: [Bitmap|Windows Metafile|JPEG]
Database connection format:
  ConnectionName
  Server: Server
  Database: Database
  User: User
  Default schema:
Data source format:
  DataSourceName[(DataType param1, . . . )]
  Connection: ConnectionName
  SQL: SQL
Scene format:
  SceneName[(DataType param1, . . . )]
  Local parameters:
    Parameter name: ParamName
    Description: Description
    Default value: [Value]
    . . .
  Viewpoints:
    Viewpoint name: ViewpointName [(Built-in)]
    Description: Description
    Location: (X, Y)
    Zoom factor: Zoom%
    . . .
  Objects:
    ExtendedObjectName
    Properties:
    DataType PropertyName=PropertyValue
    . . .
    Events:
    EventName(DataType EventParam1, . . . )
      [Param=Expression]
      . . .
      [Action(Option1, . . . )]
    . . .

The pseudocode may be displayed using a color-coded syntax. For example section headings may be displayed in green, data types may be displayed in blue, and all other text may be displayed in black. The pseudocode may be updated each time a change is made anywhere within the world.

The Output window is a dockable control bar which displays compile and execution information as a world is being developed and viewed. It also displays warnings and error messages. The Output window may be resized vertically when docked and both vertically and horizontally when floating.

In runtime mode, a viewpoints dialog box may be provided for navigating a world. Scenes allowing direct access may be displayed in the Scenes combobox. The viewpoints for the selected scene may be displayed in the Viewpoints listbox. Selecting a viewpoint updates the values of the location edit controls. The values in these controls can be changed to a custom designation by specifying a location and zoom factor.

A Layout Wizard may be provided to guide the user through the steps in creating a new layout. The first two steps common to all layouts are to select the layout and then the data source. Each layout may then have as many additional layout-specific steps as necessary to create the layout.

Layouts are spatial arrangements of data elements resulting from a data source with supporting context information such as a set of axes. The layouts may fall into the following set of 5 categories:

Charts—used for presenting series information.

Maps—used for laying out multiple curves or series of information within a single data source.

Hierarchies—used for showing object dependencies.

Patterns—used for laying out independent objects in an ordered pattern.

Forms—used for displaying a single record in a data source (if the data source results in more than one row, subsequent rows are ignored).

Layouts can be placed anywhere on a scene or data element drawing. Some layout types such as maps and scatter charts support more than one data element, thus allowing "layering" of information. In this case, each data element can be assigned a visibility that depends on the current zoom level, thus allowing more information to be presented at greater zoom levels.

Axis nodes are attached to layouts that require them. For some chart types such as bar and column charts which have an axis that is based on text labels rather than numeric values, one or more of these axes may require a data source and may thus be data-bound. Axes that may be supported include linear, logarithmic, and date/time axes. These axes may also support auto-adjusting label and tick increments so that zooming may provide more information on precise axis values.

Certain layout types may use locators rather than axes to place data elements. These locators may not be displayed visually at design time, but their properties may be displayed in the Object Inspector along with those of the other objects in a layout. Composite layouts, where a data element within a layout may contain a layout itself, may also be used. Typically, the data source associated with the second layout may be parameterized, with one or more parameters linked to a column of the parent layout's data source.

Identifiers are names for elements within a virtual world such as objects, data sources, scenes, parameters, user classes, colormaps, color sequences, and viewpoints. Identifiers are case insensitive and may be of any length greater than or equal to one character.

Object properties consist of named attributes that define an object's appearance in terms of a functional expression. Access to these properties are provided through the Object Inspector. Their values are set at runtime based on the calculated result of the expressions. An expression may include the names of one or more data source columns which are automatically bound to a result row at runtime.

Object property expressions result in one of the following base data types: Boolean, Numeric, String, Point, PointList, and Image. Derived Numeric types include Color, DateTime, Enum, Integer, and Percentage. Derived String types include FilePath (or URL) and FontName.

Referring now to FIG. 2, the object inspector 30 is shown in more detail. The object inspector 30 provides two columns, an attribute name column 100 and a property column 110. The object being inspected in FIG. 2 has properties 112, 114, 116, 118, 120, 122, 124 and 126. Particularly, properties 114, 116, 118, 120, 124 and 126 are static constants. However, properties 112 and 122 are dynamic and are evaluated at run time. Due to the dynamic properties 112 and 122, to create a data driven application, the user only needs to enter the dynamic properties and code may be automatically generated. Thus, the data binding of the dynamic properties 112 and 122 is seamlessly integrated into the property sheet 30.

The Object Inspector window 30 is a dockable control bar which displays an object's properties and events. The Object Inspector may be resized horizontally when docked and both vertically and horizontally when floating. The window may dock to the left or right of the world workspace when its location overlaps the docking site while being dragged. The Object Inspector 30 is displayed when a scene editor or data element editor window is active in design mode and displays a drop-down combobox containing a list of all objects within scope of the editor. A "dot" notation is used to denote compound objects. For example, "ScatterChart1.DataElement1" denotes that DataElement1 is an object owned by ScatterChart1.

Beneath the object selection combobox is a tabbed sheet displaying either the properties or the events for an object. When the properties tab is selected, a 2-column entry form is displayed for setting the values of the selected object's properties. The left column is a read-only column that displays the name of the property, while the right column is a read/write column that displays the property's value. Values entered in the right column may be constants or may be calculated values containing functions of parameters or column names from a data source. When a property value is of an enumerated type (a value that can only be set to a finite number of values), a drop-down combobox may be displayed listing the legal values for the property. Enumerated types include but are not limited to the following:

Font name (e.g., "Arial", "Courier")

Color (e.g., Red, Blue)

Text alignment (e.g., Left, Right)

Text anchor points (e.g., LowerLeft, UpperRight)

Boolean values (e.g., True or False)

Line style (e.g., Solid, Dash)

Fill pattern (e.g., Solid, Horizontal)

When a property is a date or time, a calendar control may be displayed beneath the property value when the field is active.

Form and data element objects provide control over the values of query parameters through a QueryParameters object listed in the Object Inspector. The QueryParameters object is a child object of the form or data element and contains a property for each query parameter. If the query is not parameterized, the QueryParameters object is not displayed in the Object Inspector. The values contained by the object are used to set the query's properties at runtime before the query is executed.

FIG. 3 shows a property object model of an abstract base class VcPropertyBag 200. VcPropertyBag 200 acts as a container for a set of properties that are specific to one or more derived classes. VcPropertyBag 200 provides an interface for accessing and manipulating properties and their values. It also provides a pure virtual method for obtaining type information on the derived object's set of properties.

Derived from VcPropertyBag 200 are an abstract base class VcScene 202 and an abstract base class VcDrawing-Node 204. VcScene 202 is the class for a scene and inherits properties from VcPropertyBag 200. VcDrawingNode 204 is an abstract base class for all graphical objects displayed in a scene and also inherits properties from VcPropertyBag 200. VcDrawingNode 204 provides a set of pure virtual methods for manipulating properties in support of movement, scaling, and other standard editing operations. Derived classes are responsible for mapping the editing operations to the appropriate properties.

VcPropertyBag 200 also has a set of properties m_properties of class VcProperty 210, which contains all information about a specific object property, including name and enumerated type information, m_expectedType. m_expectedType describes the data type of the resulting property value (e.g., boolean, numeric, string, etc.), stores the path to access the object m_path, and manages a design-time value m_designValue and a run-time value m_runtimeValue for the property. The design-time always evaluates to a constant so that the container object may be displayed in isolation (without links to data or parameters). When the run-time value is also constant, the two values are set to the same value.

VcProperty 210 has an m_name property which belongs to CString 212, a standard string class to provide storage for the property's name. The VcProperty object 210 also has a m_path property of a class called VcPropertyPath 214, which stores an identifier for a property that is unique within the VcPropertyBag's set of properties, and which provides a pointer, m_next, to a linked list of VcPropertyPath to support aggregated property bags.

VcProperty 210 also has a property m_design value which belongs to a class called VcPropertyValue 216. VcPropertyValue 216 stores a function representing the design-time value for the property (VcFunction 220) and stores the expression entered by the user so that case-sensitivity, spacing, and other particulars may be displayed back to the user as entered (CString 218).

VcFunction 220 is an abstract base class for a parsed expression element and the function is the root element for an expression tree that may be evaluated by supplying a context object. CString 218 is a standard string class which provides storage for the expression entered by the user.

Finally, VcProperty object 210 also has a m_runtime value property which belongs to an abstract base class VcPropertyValue 222. VcPropertyValue 222 stores a function representing the run-time value for the property and stores the expression entered by the user so that case-sensitivity, spacing, and other particulars may be displayed back to the user as entered.

Turning now to FIG. 4, a diagram illustrating the execution of an exemplary byte code is shown. In this example, the user has specified a function in the form of an expression. The expression is subsequently parsed to generate the byte code, which is a high level set of instructions representing the desired operations and which is executed at run-time. The execution of the byte code is diagramed in FIG. 4.

FIG. 4 shows the execution of an exemplary VcStmtCreateShape byte code 302. The byte code 302 creates an instance of a particular shaped object when executed and records a tokenized name for the object for a hash table lookup. One exemplary implementation pseudocode for the construction of the object shape to be generated by the byte code 302 is shown as block 310. In the implementation pseudocode block 310 for constructing the shape of the object, when a VcStmtCreateShape's Perform() method is called, it calls a factory object's CreateShape() method to create a new shape object and then stores a pointer to the object in a hash table owned by a context object for later lookup when setting properties. Finally, the method releases the reference to the shape established during its creation.

The byte code 302 has an m_objectId property which is a member of the standard CString class 300 to provide storage for the tokenized name of the shape. The byte code 302 has a m_factory property which is a member of the abstract base class VcShapeFactory 304 which is responsible for creating a shape within a scene. Derived classes of VcShapeFactory 304 must override the pure virtual CreateShape() method in order to create a particular class of shape and add it to a canvas display list.

VcShapeFactory 304 creates an instance of a shape object which is derived from the abstract base class VcShape 306. VcShape 306 is an abstract base class for all shape objects. It provides a transaction-oriented, polymorphic interface for setting shape properties. Derived classes of VcShape are responsible for implementing rendering and hit-detection support.

FIG. 4 also shows an abstract class VcStmtSetProperty 320, which is an abstract class for byte code statements to set the value of a shape's property when executed. Derived classes of VcStmtSetProperty 320 represent each data type. The abstract class VcStmtSetProperty 320 stores the tokenized name of the shape and a set of the property identities necessary to uniquely address the property. VcStmtSetProperty 320 has a property m_objectId which is a member of the CString class 322 and an m_propPath property which is a member of class VcPropertyPath 324. VcPropertyPath 324 stores an identifier for a property that is unique within the shape's set of properties, and provides a pointer, m_next, to a linked list VcPropertyPath to support aggregated shapes.

VcStmtSetProperty 320 in turn is inherited by VcStmtSetStringProperty 326 which sets the value of a shape's property to a string value, and which contains a pointer to an abstract string function VcSftn 328 for evaluating the property value before setting the shape's property. VcSftn 328 is derived from VcFunction which evaluates to a string for a given context and the function is the root element for a parsed expression tree containing the parsed elements of the function.

One implementation of the VcStmtSetStringProperty byte code 326 is shown in block 330. In this implementation for setting a shape's property, when the VcStmtSetStringProperty's Perform() method is called, it retrieves the shape from the context's hash table. It then evaluates the string function with the given context and passes the result to the shape via the property path.

Turning now to FIG. 5, a diagram illustrating a sample parsed property function is shown. The function in this case is the VcStmtSetStringProperty function 350. The function 350 has an object identification value "Text1" 352, which is a member of the class CString. This is the tokenized name of the shape object containing the property to be set. VcStmtSetStringProperty 350 is a sample byte code statement which sets the value of the Text property owned by the object Text1 to the calculated value resulting from appending last_name to first_name, separated by a space character. In this example, m_objectId points to a string identifying the target object, Text1; m_propPath points to the address of the property to be set within the text object; and m_ftn points to a string function which evaluates to the property's value.

VcStmtSetStringProperty 350 has a property path whose values are set in Block 354. Finally, VcStmtSetStringProperty 350 has been designated to execute a VcSftnConcatenate function 360. VcSftnConcatenate 360 is a string function derived from VcSftn which concatenates the results of two member string functions, m_ftn1 (first_name+" ") and m_ftn2 (last_name).

Within the block 360, two functions are further specified. Traversing down the left branch of the tree, a VcSftnConcatenate function 362 is designated. VcSftnConcatenate 362 is responsible for evaluating the expression (first_name+" ") using its two member string functions, m_ftn1 and m_ftn2. Within the block 362 are two additional functions, a VcSftnLookup function 364, a string function responsible for looking up the current value of the identifier stored in m_ref ("first_name"), and a VcSftnConstant function 370, a string function responsible for storing a constant string value.

The evaluation of the Lookup function 364 is determined by character string 366, which is a standard string class to provide storage for the name of the identifier, "first_name". The evaluation of the constant function 370 results in a character string which is a space (the string constant " ") in block 372.

Traversing down the right side of the tree from the VcSftn concatenate function 360, a VcSftnLookup function 380 is evaluated. VcSftnLookup 380 is a string function responsible for looking up the current value of the identifier stored in m_ref ("last_name"). The evaluation of the VcSftnLookup function 380 results in a character string.

An object model of the code generation process from a scene is illustrated in more detail in FIG. 6. The scene contains a list of drawing nodes representing the code generators for each shape and logic element within the scene. An object VcScene 400 defines a drawing layer or canvas for all graphical objects displayed in the viewing area. A CreateMethod() function generates a series of byte code statements that create and populate the scene with graphical objects when executed. These statements are stored in an object called VcCGMethod 410.

VcScene 400 contains a list m_nodes of objects derived from class VcDrawingNode 402. VcDrawingNode 402 is an abstract base class for all shape and logic nodes which represent the contents of a scene. VcDrawingNode 402 defines an interface, GetExecStmts(), for generating the list of VcStmt execution statements in derived classes. VcDrawingNode 402 is subclassed by VcShapeNode 404. VcShapeNode 404 is an abstract base class for nodes which generate shapes. Derived classes of VcShapeNode 404 generate the byte code statements necessary to construct and set the properties of each type of shape.

VcShapeNode 404 in turn is subclassed by the VcDataNode class 406, which is a class of shape node which binds a data source to a graphical template representing the layout of objects for each row in a query. The byte code generated by the VcDataNode iterates over the result set supplied by the data source, creates a set of objects, and adds them to the active scene.

VcDrawingNode 402 is also inherited by a class of drawing node VcLogicNode 408, which in turn is inherited by VcDataSource 410. VcLogicNode 408 is a class of drawing node which generates byte code that defines relationships between shape nodes and the user. VcDataSource 410 is a class of logic node representing an abstract source of data. Derived classes are responsible for generating byte code which results in a table of data used by the data node to generate the graphics in a layout.

VcDataNode class 406 contains an instance of VcDataSource 410. The VcDataSource 410 is inherited by a class VcQueryDataSource 412. VcQueryDataSource 412 is a class of data source responsible for interacting with a query object to generate the byte code which constructs a query instance, substitutes runtime parameters, and executes the query.

The VcQueryDataSource 412 in turn points to a query object m_query, a member of VcQuery 414 which stores information about an SQL query, including the names and types of columns and parameters. The VcQuery object 414 in turn has a set of columns stored in a VcColumn class 416 and a set of parameters stored in VcParameter class 417. VcColumn 416 stores information about a column of data that may be retrieved from the database so that it may be referenced by the context object used by the byte code execution statements. VcParameter 417 represents a named placeholder object acting as an argument to a SQL SELECT statement. Before the SQL statement can be executed, the parameter is replaced with the runtime value of the parameter.

The VcScene object 400 generates an instance of the class VcCGMethod 410 when its CreateMethod() member function is called. VcCGMethod 410 in turn has a set of objects that belong to an abstract base class VcStmt 420. VcStmt 420 is an abstract base class for all byte code statements. Its pure virtual method, Perform(), defines an execution interface that must be implemented by all derived classes. The VcStmt abstract base class 420 is inherited by a number of byte code statements including 422, 424, 426, 428 and 430. VcStmtCreateShape 422 is a byte code statement which creates an instance of a particular shape object when executed. The statement 422 records a tokenized name for the object for hash table lookup. VcStmtCreateQuery 424 is a byte code statement which creates an instance of a particular query object when executed. VcStmtBeginProperties 426 is a byte code statement which notifies a shape instance that its properties are about to be set. VcStmtSetProperty 428 is abstract class for byte code statements which set the value of a shape's property when executed. Derived classes represent each data type stores the tokenized name of the shape and the set of property ID's necessary to uniquely address the property. Finally, VcStmtEndProperties 430 is a byte code statement which notifies a shape instance that changes to its properties are complete and that it can perform any calculations which depend on more than one property.

The object model of the code execution process is similar to the object model shown in FIG. 4. Briefly, the VcStmtCreateShape byte code records a tokenized name for the object in a hash lookup table and creates an instance of a particular shaped object when executed. The VcStmtCreatesShape byte code statement contains a factory object derived from a VcShapeFactory abstract base class which is responsible for creating a shape within a scene. Additionally, the VcStmtSetProperty abstract class stores the tokenized name of the shape and the set of property ID's necessary to uniquely address the property. The VcStmtSetStringProperty byte code statement sets the value of a shape's property to a string value and contains a pointer to an abstract string function for evaluating the property value before setting the shape's property.

Turning now to FIG. 7, a property sheet entry process 440 is shown. In using the property sheet, a user enters an expression (step 442). The expression is then parsed (step 444) and checked for validity (step 446). In the event the expression is invalid, the process clears the runtime value using the design value as needed (step 448) and displays an error message (step 450). Otherwise, in the event that the expression is valid, the process creates a function and stores the function as the run-time value (step 452). Next, the process determines whether the function is a constant (step 454), and if so, clones the function and stores the design-time value in place thereof (step 456).

Next, the process invalidates a byte code execution image, which contains a run-time executable code for the byte code (step 458). It then checks whether the run-time display needs to be automatically updated (step 460). If so, byte code is generated (step 470) and executed (step 472). From step 460 or step 472, the process exits (step 474).

Turning now to FIG. 8, a process 820 for visually manipulating an object is detailed. First, the process determines which object property maps to which changed attribute (step 822). Next, a constant function is created to represent the new attribute value which is then stored as run-time property value and design-time property value (step 824). The byte code execution image is then invalidated (step 826). The process then checks whether the run-time display needs to be automatically updated (step 828). If so, the byte code is generated (step 830). Step 830 is illustrated in more detail in FIG. 9. From step 830, the process then executes the byte code (step 832). Step 832 is illustrated in more detail in FIG. 11. From step 828 or step 832, the process exits (step 834).

Turning now to FIG. 9, a process 600 for generating byte code is shown. The process takes as inputs previously stored application resources (step 602) and obtains a first scene (step 604). The process then obtains a first node in the scene (step 606). Next, the byte code execution statements for the node are retrieved (step 608). This step is illustrated in more detail in FIG. 10. From step 608, the process determines whether additional nodes need to be processed (step 610), and if so, obtains the next node (step 612) before looping back to step 608.

When all nodes have been processed, the process creates the VcCGMethod and stores statements associated with the scene (step 614). Next, the process determines whether additional scenes remain to be processed (step 616). If so, the next scene is obtained (step 618) and the process loops back to step 606 to continue the byte code generation process. When all scenes have been handled, the process then creates the byte code execution image (step 620) before exiting (step 622).

Referring now to FIG. 10, a process 630 for obtaining byte code execution statements for an object node is shown. First, the process determines the node type (step 632). If the node is a shape, the process generates a shape creation statement (step 634) as well as a statement to begin property capture (step 636). Steps 638–644 then generate statements to set each retrieved property. Finally, the process creates a statement to commit the properties (step 646).

On the other hand, if the node is a query data source, the process obtains a query and generates a parameterized SQL statement (step 648). The process then determines column names to be used as referenceable identifiers (step 650). Next, a statement is created to create a query (step 652). Steps 654–660 then create one or more statements which set each query parameter value. Finally, the process creates a statement to execute the query (step 662). From step 646 or step 662, the process exits (step 664).

Referring now to FIG. 11, a process 666 to execute the byte code is shown. First, an execution context is created (step 668). The process then calls VcCGMethod Perform() method (step 670). The statements are retrieved (step 672). Next, the statement is classified (step 674). From step 674, when a VcStmtCreateShape statement is encountered, the process generates a new shape (step 676) and stores the shape in a context-hash table using a tokenized shape name (step 678). From step 674, when a VcStmtBeginProperties statement is encountered, the process looks up the shape information in the hash table (step 680). The process then calls the shape's OnPropertiesBegin() method (step 682). When a VcStmtSetProperty statement is encountered, the process looks up the shape information in the hash table (step 684). It then evaluates the property expression (step 686) before calling the shape's SetProperty() method to assign the value to the property. When a VcStmtEndProperties statement is encountered, the process looks up the shape information in the hash table (step 690). It then calls the shape's OnPropertiesEnd() method (step 692). The shape is then initialized (step 694) and added to a canvas display list (step 696).

From step 678, 682, 688 or 696, the process then checks whether additional statements need to be executed (step 698) and if so, the next statement is obtained (step 800) before the process loops back to step 674.

From step 698, the process then deletes the execution context (step 802) and refreshes the canvas (step 804). Finally the process exits (steps 806).

A chart illustrating a graph editing system is shown in FIG. 12. A scene graph 480 provides a hierarchical representation of an application. Each element of the scene graph 480 is called a node and the node is used in generating a byte code. Additionally, two views 482 and 484 of the data are shown. The view 482 is a layout (a map) showing data that has been retrieved from two datasets.

In the view 484, a datapoint may be represented as a single image 485, which is highlighted in FIG. 12. The image 485 is shown in the design mode with a placeholder image. Attributes associated with the image 485 are shown in a window 486. The user can edit any data element since each data element has its own drawing window. Thus, a graph may be placed at the datapoint so that a graph exists within a data point.

Since the editing system of FIG. 12 allows the user to define graphs within data points that in turn are nested within graphs themselves, the editing system of FIG. 12 provides a way to drill down and see more detail. Thus, when used to show scenes with varying levels of detail, the user may zoom into a dot which turns into a graph and, when the user zooms into the graph, its datapoints turn into additional graphs to allow the user to drill down for more detail. The graph editing system provides a convenient way of editing the representation of a single datapoint and any arbitrary representation for a datapoint that may be as general as the parent scene itself.

The mathematics of a wormhole is discussed next. Wormholes are special objects that allow a user to look through a window in one scene to another scene. FIG. 13 illustrates this effect and shows how a composite zoom factor is computed for the target scene.

FIG. 13 shows a wormhole, which is a type of hyperlink that allows the user to pass context information through the hyperlink and at the same time see though the hyperlink to the other side. Since the other side of the hyperlink is observable, that side is "transparent" to the user. In FIG. 13, a wormhole 490, shown as a window from a first scene 492 to a second scene 494. The wormhole 490 provides state information, as opposed to a conventional hyperlink which is stateless. From a user location 491, relationships between a first elevation ($elev_1$) 496 to the first scene 492 and a second elevation ($elev_2$) 498 to the second scene 494 may be expressed as:

$$elev_1 = \frac{1}{Zoom_{scene1}}$$

$$elev_2 = \frac{1}{Zoom_{scene1}} + \left[\frac{1}{Zoom_{wormhole}} - 1\right]$$

In this case, each of the Zoom factors represents a magnification factor. Moreover, the Zoom factors are the reciprocal values for the associated elevation parameters. For instance, at a 100% Zoom factor, the elevation parameter is 1, while at a 200% Zoom factor, the elevation parameter is 0.5.

The wormhole window sets the values of parameters that have been defined for the scene. The wormhole window can also act as a type of lens that can apply magnification to the target scene. The target scene of a wormhole may be the same as the source scene for recursive display of the same scene. This is particularly useful since an incremental zoom factor applied by the wormhole can be used to reduce clutter in dense regions of data or alternatively to provide additional magnification for increased levels of detail. The wormhole has a parameter that defines the recursion limit so that the recursion does not continue infinitely.

The user can jump through a wormhole in order to "drill down" for more information and also to "activate" the objects in the target scene. This also eliminates the effects of the incremental zoom factor as well as frees up memory used by objects in the first scene. As the user navigates a world and interacts with objects using the mouse, notification events are generated which may trigger behavior. This behavior is determined by the developer at design time and consists of the following two optional steps (in order): setting the value of scene and/or global parameters, and executing an action.

Wormholes provide control over the values of scene parameters through a SceneParameters object listed in the Object Inspector. The SceneParameters object is a child object of the wormhole and contains a property for each parameter. If the target scene is not parameterized, the SceneParameters object may not be displayed in the Object Inspector. The values contained by the object are used to set the scene's properties at runtime.

Three types of parameters drive runtime values in queries and also monitor and control various user context variables: global parameters, scene parameters, and query parameters. Global parameters are exposed in the runtime user as properties to be set or monitored by the container application. Further, built-in global parameters may be used: UserX (tracks or sets the user's current horizontal offset from center in inches); UserY (tracks or sets the user's current vertical offset from center in inches); UserZoom (tracks or sets the user's current zoom (magnification) level); and UserClass (contains the name of the user's profile class).

Query parameters are set by the data source before the query is executed. Scene parameters may be set by wormholes or by event actions. They have the following attributes:

Name—parameter identifier.
Data type—value type.
Description—available for internal documentation.
Default value—value used if not set by a wormhole's SceneParameters child object or by an event action. If no default value is available, the scene cannot be viewed.

User classes may be used for customizing the behavior or appearance of the virtual world based on user identity. For example, a wormhole to sales forecasts may only be visible to sales personnel and executive staff members, or a hospital floor plan layout may highlight vacant beds for an administrator versus cardiac patient beds for a cardiologist. The default user class in all new worlds is "Anonymous."

The current user class for a world is stored in the UserClass global parameter. A property value or event method can be based on the current user class by use of the IsUser(class_name) property function which returns a true or false value depending on whether the UserClass variable is a member of the class_name user class. Standard boolean expressions can also contain the UserClass parameter for direct comparison or display.

User classes can be subclassed in order to refine a class further. A user subclass of one class can also be a subclass of another class, thus resulting in a flexible, multiple-inheritance hierarchy of user classes. When a user class is deleted by the user and it exists as a subclass of more than one other user class, the user may be asked whether or not to delete all occurrences of the user class or just to delete the selected instance.

Turning now to FIG. 14, an object model of a wormhole is shown in more detail. A VcScene class 500 defines the drawing layer (canvas) for all graphical objects displayed in viewing area. VcScene 500 provides a set of parameters which may be referenced by the properties of nodes contained within the scene. Before the scene can be rendered, each parameter must be set similar to the way arguments to a function must be defined before the function is called. A wormhole settings node then supplies the calculated settings for each scene parameter when the scene is viewed through the wormhole.

The VcScene class 500 has properties that are a member of a VcParameter class 502 and a list of nodes derived from a VcDrawingNode base class 504. VcParameter 502 stores information about a scene parameter, including its name and data type, while VcDrawingNode 504 is an abstract base class for all shape and logic nodes which represent the contents of a scene. VcDrawingNode 504 contains properties which may be constant or calculated. Calculated properties may depend on one or more scene parameters.

The VcDrawingNode abstract base class 504 in turn is inherited by a VcShapeNode 506, which is further inherited by VcWormholeNode 508. VcShapeNode 506 is abstract base class for all visible node types. Derived classes of VcShapeNode 506 implement the specific attributes and behavior of each type of shape. VcWormholeNode 508 is a class of shape node in a scene which links to another scene. It contains a pointer to a settings node for setting the values of all scene parameters before the scene is rendered.

VcWormholeNode 508 has a m_sceneParamSettings property which is a member of the VcWormholeSettingsNode 512 class. VcWormholeSettingsNode 512 is a class of logic node holding wormhole-specific settings for each parameter in the connecting scene. These settings are evaluated and passed to the scene before it is rendered in the wormhole.

VcWormholeSettingsNode 512 is also derived from VcLogicNode 510, which in turn is derived from the VcDrawingNode 504. VcLogicNode 510 is an abstract base class for nodes which defines relationships between shape nodes and the user.

FIGS. 15 and 16 show exemplary wormhole usages. FIG. 15 shows four wormholes: a portfolio-risk-management wormhole 700, a market-data wormhole 710, an investments-under-consideration wormhole 720 and a first-call-analyst-recommendation wormhole 730. The portfolio-risk-management wormhole 700, in turn shows three detailed wormholes 702, 704 and 706 displaying a third level view of the scene and a chart 708. Each of the three detailed wormholes 702, 704 and 706 shows financial performance associated with three separate funds or portfolios. Moreover, views of a given scene arising from one wormhole representing one fund or portfolio may be different from views of the same scene arising from another wormhole representing a different fund. Thus, for example, by drilling down the portfolio risk management wormhole 700, through one of the funds 702, 704 or 706, and drilling down to a company in a particular portfolio, context information is accumulated with every drill-down so that the resulting view of the company is generated in relationship to the specific fund or portfolio. The information may include the quantity of the company's stock held by the fund, and the duration of ownership of the company's stock, among others.

The scene being presented in each wormhole in FIG. 16 is parameterized in company_ID in a manner analogous to an argument to a function. In this case, the scene itself has an argument that specifies what company the user is looking at and the scene is accordingly customized. Thus, when the user looks through any of these wormholes, the scene looks different because it takes on the identity of the specific wormhole being viewed by the user.

As discussed above, the system provides dynamic views of data without programming expertise. Users are thus moved closer to the data so that application development time is reduced. User interfaces may be created quickly and easily for information rich databases and for applications such as data warehousing and decision support. Further, limitations inherent in conventional forms-based or report-based applications are avoided.

Moreover, the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Other embodiments are within the scope of the following claims.

What is claimed is:

1. A hyperlink system for viewing a plurality of visualization scenes of a relational database from a viewpoint, comprising:
    a first visualization scene located at a first distance from the viewpoint, wherein the first visualization scene includes context information;
    a second visualization scene nested in the first scene and located at a second distance from the viewpoint, wherein the second visualization scene is configurable by the context information in the first visualization scene; and
    a wormhole projecting from the first visualization scene to the second visualization scene based on the first and second distances, wherein the wormhole provides context information from the first scene to the second scene.

2. The hyperlink system of claim 1, wherein the second scene is characterized by one or more scene parameters and wherein the wormhole has a context information attribute to provide context information from the first scene to the second scene by setting the value of the one or more scene parameters that characterize the second scene.

3. The hyperlink system of claim 1, wherein each scene is displayed in one or more nested windows.

4. The hyperlink system of claim 1, wherein each scene contains one or more objects representing the content of the relational database.

5. The hyperlink system of claim 4, wherein each object is associated with a behavior, further comprising one or more notification events for triggering the object behavior as a user navigates the hyperlink system.

6. The hyperlink system of claim 1, wherein the first scene has a first zoom factor, and the first distance is proportional to the inverse of the first zoom factor.

7. The hyperlink system of claim 6, wherein the second scene has a second zoom factor, and the second distance is determined from the first distance and the inverse of the second zoom factor.

8. The hyperlink system of claim 7, further comprising a query generator coupled to the wormhole, wherein the query generator dynamically generates queries to the relational database to generate visualizations for the first and second scenes based on the first and second zoom factors.

9. A method for navigating a plurality of visualization scenes of a relational database, comprising:
    navigating a first visualization scene having context information and containing a wormhole having a context information attribute to store the first visualization scene's context information;
    receiving a notification event to jump through the wormhole from the first visualization scene to a second visualization scene by rendering the second visualization scene according to the context information stored in the wormhole's context information attribute.

10. The method of claim 9, wherein the second scene has a scene parameter and the wormhole provides the context information from the first scene to the second scene by setting the value of the scene parameter using the context information from the first scene.

11. The method of claim 10, wherein the context information from the first scene is a global parameter, a scene parameter, or a query parameter.

12. The method of claim 10, wherein the context information from the first scene comprises one or more global parameters.

13. The method of claim 9, wherein the first scene is located a first distance from a viewpoint, the second scene is located a second distance from the viewpoint, and the wormhole projects from the first scene to the second scene based on the first and second distances.

14. The method of claim 13, further comprising dynamically generating a relational database query in response to the received notification event based on the first and second distances.

15. The method of claim 9, wherein the first scene has a first zoom factor and the first distance is proportional to the inverse of the first zoom factor.

16. The method of claim 15, wherein the second scene has a second zoom factor and the second distance is determined from the first distance and the inverse of the second zoom factor.

17. A computer program product stored on a machine readable medium, comprising instructions operable to cause a programmable processor to:

navigate a first visualization scene of a relational database in response to a user input, wherein the first visualization scene has context information and contains a wormhole having a context information attribute to store the first visualization scene's context information; and receive a notification event to jump through the wormhole from the first visualization scene to a second visualization scene by rendering the second visualization scene according to the context information stored in the wormhole's context information attribute.

18. The computer program product of claim 17, wherein the second scene has a scene parameter, further comprising instructions operable to cause a processor to provide the context information from the first scene to the second scene by setting the value of the scene parameter using the context information from the first scene.

19. The computer program product of claim 18, wherein the context information from the first scene is a global parameter, a scene parameter, or a query parameter.

20. The computer program product of claim 18, wherein the context information from the first scene comprises one or more global parameters.

21. The computer program product of claim 17, wherein the first scene is located a first distance from a viewpoint, the second scene is located a second distance from the viewpoint, and the wormhole projects from the first scene to the second scene based on the first and second distances.

22. The computer program product of claim 21, further comprising instructions operable to cause a programmable processor to dynamically generate a relational database query in response to the received notification event.

23. The computer program product of claim 17, wherein the first scene has a first zoom factor and the first distance is proportional to the inverse of the first zoom factor.

24. The computer program product of claim 23, wherein the second scene has a second zoom factor and the second distance is determined from the first distance and the inverse of the second zoom factor.

* * * * *